US011956585B2

(12) United States Patent
Zhang et al.

(10) Patent No.: US 11,956,585 B2
(45) Date of Patent: Apr. 9, 2024

(54) BLUETOOTH EARPHONE

(71) Applicant: HUAWEI TECHNOLOGIES CO., LTD., Shenzhen (CN)

(72) Inventors: Junhong Zhang, Dongguan (CN); Yi Fan, Dongguan (CN); Zhongying Long, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 162 days.

(21) Appl. No.: 17/771,576

(22) PCT Filed: Oct. 14, 2020

(86) PCT No.: PCT/CN2020/120866
§ 371 (c)(1),
(2) Date: Apr. 25, 2022

(87) PCT Pub. No.: WO2021/082916
PCT Pub. Date: May 6, 2021

(65) Prior Publication Data

US 2022/0417636 A1 Dec. 29, 2022

(30) Foreign Application Priority Data

Oct. 31, 2019 (CN) ........................ 201911056997.1

(51) Int. Cl.
*H04R 1/10* (2006.01)
*H01Q 1/48* (2006.01)
*H01Q 1/50* (2006.01)

(52) U.S. Cl.
CPC ............. *H04R 1/1016* (2013.01); *H01Q 1/48* (2013.01); *H01Q 1/50* (2013.01); *H04R 1/1041* (2013.01); *H04R 2420/07* (2013.01)

(58) Field of Classification Search
CPC ................ H04R 1/1016; H04R 1/1041; H04R 2420/07; H04R 1/1091; H04R 2225/51; H01Q 1/48; H01Q 1/50
See application file for complete search history.

(56) References Cited

U.S. PATENT DOCUMENTS

2012/0224710 A1 9/2012 Terlizzi et al.
2017/0245040 A1* 8/2017 Hankey ............ H04W 52/0274
(Continued)

FOREIGN PATENT DOCUMENTS

CN 106331928 A 1/2017
CN 206354604 U 7/2017
(Continued)

*Primary Examiner* — Mark Fischer
(74) *Attorney, Agent, or Firm* — Maier & Maier, PLLC

(57) ABSTRACT

A Bluetooth earphone includes an antenna and a circuit board. The circuit board includes a first grounding branch and a second grounding branch. The first grounding branch is connected in series to a first switch, and the second grounding branch is connected in series to a second switch. When the first switch is on, the first grounding branch serves as a current return path of the antenna. When the second switch is on, the second grounding branch serves as a current return path of the antenna. By controlling the on or off state of the first switch and the second switch, the Bluetooth earphone can switch ground structures of the antenna and select different current return paths for the antenna, to switch radiation patterns of the antenna.

14 Claims, 23 Drawing Sheets

(56) References Cited

U.S. PATENT DOCUMENTS

| | | | |
|---|---|---|---|
| 2018/0070179 | A1 | 3/2018 | McAuliffe et al. |
| 2018/0103312 | A1 | 4/2018 | McAuliffe et al. |

FOREIGN PATENT DOCUMENTS

| | | | |
|---|---|---|---|
| CN | 107155149 | A | 9/2017 |
| CN | 207039829 | U | 2/2018 |
| CN | 108281759 | A | 7/2018 |
| CN | 208386865 | U | 1/2019 |
| CN | 109841947 | A | 6/2019 |
| CN | 110198505 | A | 9/2019 |
| CN | 209357910 | U | 9/2019 |
| JP | 2008092265 | A | 4/2008 |

* cited by examiner

BLUETOOTH EARPHONE

This application is a National Stage of International Patent Application No. PCT/CN2020/120866, filed on Oct. 14, 2020, which claims priority to Chinese Patent Application No. 201911056997.1, filed on Oct. 31, 2019, both of which are hereby incorporated by reference in their entirety.

TECHNICAL FIELD

Embodiments relate to the field of bluetooth device technologies, and in particular, to a bluetooth earphone.

BACKGROUND

Currently, only one bluetooth antenna is usually disposed on a bluetooth earphone and the antenna has an obviously low antenna gain in some directions. When the antenna transmits and receives a signal in these low-antenna-gain directions, signal quality worsens and communication experience deteriorates.

SUMMARY

Embodiments provide a bluetooth earphone, and antenna gains of an antenna of the bluetooth earphone in all directions are relatively even.

According to a first aspect, an embodiment provides a bluetooth earphone. The bluetooth earphone has an earbud part and an earphone handle part. The earbud part is provided with an earpiece module. The earphone handle part includes a connecting section connected to the earbud part, and a top section and a bottom section located at both sides of the connecting section. The bottom section of the earphone handle part is provided with a first microphone module.

The bluetooth earphone includes an antenna and a circuit board. The antenna extends from the connecting section of the earphone handle part to the top section of the earphone handle part. The circuit board has a feeding part, a first end part, a first connection part, a second end part, and a second connection part. The feeding part is located at the connecting section of the earphone handle part. The first end part is located at the earbud part. The first connection part connects the feeding part and the first end part. The second end part is located at the bottom section of the earphone handle part. The second connection part connects the feeding part and the second end part.

The circuit board includes a feeding pad, a ground plane, a first grounding branch, and a second grounding branch. The feeding pad is located at the feeding part and coupled to the antenna. The ground plane is located at the feeding part and spaced from the feeding pad. The ground plane is grounded and serves as a part of a current return path of the antenna.

One end of the first grounding branch is connected to the ground plane and the other end extends to the first end part. The first grounding branch is connected in series to a first switch. When the first switch is on, the first grounding branch is configured to form a ground current, and the first grounding branch serves as a part of a current return path of the antenna. When the first switch is off, the first switch cuts off a current on the first grounding branch, and the first grounding branch does not provide an effective current return path for the antenna.

One end of the second grounding branch is connected to the ground plane and the other end extends to the second end part. The second grounding branch is connected in series to a second switch. When the second switch is on, the second grounding branch is configured to form a ground current, and the second grounding branch serves as a part of a current return path of the antenna. When the second switch is off, the second switch cuts off a current on the second grounding branch, and the second grounding branch does not provide an effective current return path for the antenna.

In this embodiment, the bluetooth earphone may form a plurality of ground structures by controlling states (on or off) of the first switch and the second switch, and select different grounding branches, in other words, select different current return paths, for the antenna by switching the ground structures, to switch radiation patterns of the antenna. The radiation patterns of the antenna in the plurality of ground structures are complementary. Therefore, the antenna has no obvious null in each radiation direction, and antenna gains of the antenna in all directions are relatively even, thereby improving communication quality and resolving a problem of poor communication experience caused by low gains of the antenna at some angles.

In an optional embodiment, the ground plane and the feeding pad are located at different conductive layers of the circuit board to form a gap therebetween. For example, the feeding pad is located at a surface conductive layer of the circuit board, and the ground plane is located at an inner conductive layer or another surface conductive layer of the circuit board. In some other embodiments, the ground plane and the feeding pad may be located at a same layer and form a gap therebetween, so as not to touch each other.

In an optional embodiment, the first connection part and the second connection part are connected to two sides of the feeding part. One side of the feeding part that is connected to the first connection part and another side of the feeding part that is connected to the second connection part may be disposed adjacently or oppositely. In this case, the circuit board can be well arranged inside the bluetooth earphone according to a shape of the bluetooth earphone.

In an optional embodiment, the antenna is configured to form a first current. The first current is an antenna current. The antenna includes a feeding end and an end away from the feeding end. The feeding end is connected to the feeding pad by using a conductive member to be coupled to the feeding part. The first current extends from the feeding end to the end and a direction of the first current is from the connecting section of the earphone handle part to the top section of the earphone handle part. The antenna may be a quarter-wavelength antenna, to have relatively high antenna efficiency. An electrical length of the antenna may be implemented by adjusting a physical length of the antenna.

When the first switch is on and the second switch is off, the first grounding branch is configured to form a second current. The second current and the first current are capable of composing into an equivalent current in resonant mode. The first grounding branch serves as a current return path. The second current is a ground current. The second current extends from an end of the first grounding branch that is away from the ground plane to the ground plane. The second current extends from a first end part of the circuit board to the feeding part, and a direction of the second current is from the earbud part to the connecting section of the earphone handle part. When the first switch is on, an electrical length of the first grounding branch is or is close to a quarter wavelength, so that the second current is in resonant mode and effective radiation can be formed. When an electrical length of the first current is a quarter wavelength and an electrical length of the second current is a quarter wavelength, an electrical length of an equivalent current composed by the first current and the second current is a half wavelength, and the equivalent current is in resonant mode, so that an antenna signal is effectively radiated. The equivalent current extends from the earbud part to the top section of the earphone handle part.

In this embodiment, because the direction of the first current is from the connecting section of the earphone handle part to the top section of the earphone handle part, and the direction of the second current is from the earbud part to the connecting section of the earphone handle part, the direction of the equivalent current composed by the first current and the second current is from the earbud part to the top section of the earphone handle part. Therefore, when a user wears the bluetooth earphone, a radiation null of a radiation field pattern of the antenna of the bluetooth earphone is toward the user head, thereby greatly reducing an adverse effect of the user head to the antenna and enabling the antenna to have better antenna performance.

When the second switch is on and the first switch is off, the second grounding branch is configured to form a third current. The third current and the first current are capable of composing into an equivalent current in resonant mode. The second grounding branch serves as a current return path. The third current is a ground current. The third current extends from an end of the second grounding branch that is away from the ground plane to the ground plane. The third current extends from a second end part of the circuit board to the feeding part, and a direction of the third current is from the bottom section of the earphone handle part to the connecting section of the earphone handle part. When the second switch is on, an electrical length of the second grounding branch is or is close to a quarter wavelength, so that the third current is in resonant mode and effective radiation can be formed. When an electrical length of the first current is a quarter wavelength and an electrical length of the third current is a quarter wavelength, an electrical length of an equivalent current composed by the first current and the third current is a half wavelength, and the equivalent current is in resonant mode. The equivalent current extends from the bottom section of the earphone handle part to the top section of the earphone handle part.

In an optional embodiment, when the first switch is on and the second switch is on, the first grounding branch is configured to form a second current, and the second grounding branch is configured to form a third current. The first current, the second current, and the third current are capable of composing into an equivalent current in resonant mode. The first grounding branch and the second grounding branch serve as current return paths. When an electrical length of the first current is a quarter wavelength, an electrical length of the second current is a quarter wavelength, and an electrical length of the third current is a quarter wavelength, an electrical length of an equivalent current composed by the first current, the second current, and the third current is a three-quarter wavelength, and the equivalent current is in resonant mode, so that an antenna signal is effectively radiated. The equivalent current extends from the underside of the earbud part (namely, the side near the bottom section of the earphone handle part) to the top section of the earphone handle part.

In an optional embodiment, the first switch is located at the feeding part, or is located at an end of the first connection part that is close to the feeding part. In this case, an electrical length of a part of the first grounding branch that is located between the first switch and the ground plane is less than a quarter wavelength, a current on the part is not in resonant mode, and effective radiation cannot be formed. It may be understood that, in some other embodiments, the first switch may be located elsewhere, provided that the electrical length of the part of the first grounding branch that is located between the first switch and the ground plane is not equal to N/4 wavelengths, where N is a positive integer.

The second switch is located at the feeding part or at an end of the second connection part that is close to the feeding part. In this case, an electrical length of a part of the first grounding branch that is located between the first switch and the ground plane is less than a quarter wavelength, a current on the part is not in resonant mode, and effective radiation cannot be formed. It may be understood that, in some other embodiments, the second switch may be located elsewhere, provided that the electrical length of the part of the first grounding branch that is located between the first switch and the ground plane is not equal to N/4 wavelengths, where N is a positive integer.

In an optional embodiment, the first grounding branch is further connected in series to a first choke inductor, and the first choke inductor is disposed in parallel with the first switch. In this embodiment, the first grounding branch is not only configured to provide a current return path for the antenna, but also configured to provide a reference ground for another functional module of the bluetooth earphone. Because the first choke inductor is disposed in parallel with the first switch, and the first choke inductor is connected in series to the first grounding branch, the first grounding branch as a reference ground for a low frequency signal is continuous and complete. For example, the earpiece module is connected to the first grounding branch. The first grounding branch is further configured to provide a reference ground for the earpiece module. For example, an inductance value of the first choke inductor may be greater than or equal to 22 nanohenries (nH) to block a signal in the bluetooth frequency band (2.4 GHz) and allow passage of a low frequency signal that is below the bluetooth frequency band.

In an optional embodiment, the second grounding branch is further connected in series to a second choke inductor, and the second choke inductor is disposed in parallel with the second switch. In this embodiment, the second grounding branch is not only configured to provide a current return path for the antenna, but also configured to provide a reference ground for another functional module of the bluetooth earphone. Because the second choke inductor is disposed in parallel with the second switch, and the second choke inductor is connected in series to the second grounding branch, the second grounding branch as a reference ground for a low frequency signal is continuous and complete. For example, the first microphone module is connected to the second grounding branch. The second grounding branch is further configured to provide a reference ground for the first microphone module. For example, an inductance value of the second choke inductor may be greater than or equal to 22 nanohenries (nH) to block a signal in the bluetooth frequency band (2.4 GHz) and allow passage of a low frequency signal that is below the bluetooth frequency band.

In an optional embodiment, the bluetooth earphone further includes a chip. The chip is located at the earbud part and connected to the circuit board. The circuit board further includes a first low-frequency signal line and a second low-frequency signal line. One end of the first low-frequency signal line is connected to the chip and the other end extends to the first end part. The first low-frequency signal line is connected in series to a third choke inductor. One end of the second low-frequency signal line is connected to the chip and the other end extends to the second end part. The second low-frequency signal line is connected in series to a fourth choke inductor. The first low-frequency signal line and the second low-frequency signal line may be connected to another functional module of the bluetooth earphone and are configured to transmit a low-frequency signal between the functional module and the chip.

The earpiece module is connected to the first low-frequency signal line. The first low-frequency signal line transmits a signal between the earpiece module and the chip. Because some locations of the first low-frequency signal line may be capacitively coupled to the first grounding branch, the first low-frequency signal line is connected in series to the third choke inductor, and the first low-frequency signal line is isolated from the ground at a high frequency by using the third choke inductor.

The first microphone module is connected to the second low-frequency signal line. The first low-frequency signal line transmits a signal between the first microphone module and the chip. Because some locations of the second low-frequency signal line may be capacitively coupled to the second grounding branch, the second low-frequency signal line is connected in series to the fourth choke inductor, and the second low-frequency signal line is isolated from the ground at a high frequency by using the fourth choke inductor.

In an optional embodiment, the circuit board further includes a first power cable and a second power cable. One end of the first power cable is connected to the chip, and the other end of the first power cable extends to the first end part. One end of the second power cable is connected to the chip, and the other end of the second power cable extends to the second end part. The first power cable and the second power cable are connected to a power management module of the chip. The second power cable is connected to a battery, and the power management module is configured to control a charging/discharging process of the battery and a power supply process for another functional module. The first power cable and the second power cable are further configured to connect to another functional module of the bluetooth earphone, such as the earpiece module or the first microphone module, so that the battery can supply power to the functional module of the bluetooth earphone. A fifth choke inductor may be connected in series to the first power cable, and a sixth choke inductor may be connected in series to the second power cable.

In an optional embodiment, the first grounding branch is further connected in series to a first low-pass high-resistance element, and the first low-pass high-resistance element is disposed in series with the first switch and is located at a side of the first switch that is away from the ground plane. The first low-pass high-resistance element is configured to allow passage of a current whose frequency band is lower than the bluetooth signal frequency band and prevent passage of a current whose frequency band is close to the bluetooth signal frequency band. In this case, the first low-pass high-resistance element changes the electrical length of the first grounding branch as the current return path of the antenna, so that the first grounding branch meets the electrical length requirement, without affecting a function of the first grounding branch as a reference ground for a low frequency signal. For example, the first low-pass high-resistance element may be located at the first connection part or the first end part.

In an optional embodiment, the second grounding branch is further connected in series to a second low-pass high-resistance element, and the second low-pass high-resistance element is disposed in series with the second switch and is located at a side of the second switch that is away from the ground plane. The second low-pass high-resistance element is configured to allow passage of a current whose frequency band is lower than the bluetooth signal frequency band and prevent passage of a current whose frequency band is close to the bluetooth signal frequency band. In this case, the second low-pass high-resistance element changes the electrical length of the second grounding branch as the current return path of the antenna, so that the second grounding branch meets the electrical length requirement, without affecting a function of the second grounding branch as a reference ground for a low frequency signal. For example, the second low-pass high-resistance element may be located at the second connection part or the second end part.

In an optional embodiment, the first connection part includes a plurality of sequentially connected regions, and the plurality of regions include one or more flat regions and one or more bent regions. The length of the first connection part may be effectively adjusted in a manner of bending or stretching by increasing or decreasing a quantity or area of the flat regions and the bent regions, to adjust the length of the first grounding branch, so that the electrical length of the first grounding branch meets a requirement.

In an optional embodiment, the second connection part includes a plurality of sequentially connected regions, and the plurality of regions include one or more flat regions and one or more bent regions. The length of the second connection part may be effectively adjusted in a manner of bending or stretching by increasing or decreasing a quantity or area of the flat regions and the bent regions, to adjust the length of the second grounding branch, so that the electrical length of the second grounding branch meets a requirement.

In an optional embodiment, the second end part includes a plurality of sequentially connected regions, and the plurality of regions include one or more flat regions and one or more bent regions. The length of the second end part may be effectively adjusted in a manner of bending or stretching by increasing or decreasing a quantity or area of the flat regions and the bent regions, to adjust the length of the second grounding branch, so that the electrical length of the second grounding branch meets a requirement.

According to a second aspect, an embodiment further provides a bluetooth earphone. The bluetooth earphone has an earbud part and an earphone handle part. The earbud part is provided with an earpiece module. The earphone handle part includes a connecting section connected to the earbud part, and a top section and a bottom section located at both sides of the connecting section. The bottom section of the earphone handle part is provided with a first microphone module.

The bluetooth earphone includes an antenna and a circuit board. The antenna extends from the connecting section of the earphone handle part to the top section of the earphone handle part. The circuit board has a feeding part, a first end part, a first connection part, a second end part, and a second connection part. The feeding part is located at the connecting section of the earphone handle part. The first end part is located at the earbud part. The first connection part connects the feeding part and the first end part. The second end part is located at the bottom section of the earphone handle part. The second connection part connects the feeding part and the second end part.

The circuit board includes a feeding pad, a ground plane, a first grounding branch, and a second grounding branch. The feeding pad is located at the feeding part and coupled to the antenna. The ground plane is located at the feeding part and spaced from the feeding pad. One end of the first grounding branch is connected to the ground plane and the other end extends to the first end part. One end of the second grounding branch is connected to the ground plane and the other end extends to the second end part.

The second grounding branch is connected in series to a first branch. The second grounding branch further includes a second branch. One end of the second branch is connected to one end of the first branch, and the other end of the second branch is connected or coupled to the other end of the first branch. The second branch is connected in series to a switch. The second branch is shorter than the first branch.

In this embodiment, because a part that is of the second connection part of the circuit board and that is close to the feeding part is located at the connecting section of the earphone handle part of the bluetooth earphone, the second connection part needs to be folded inevitably. Therefore, the second connection part is relatively long, and the second grounding branch passing the second connection part and extending to the second end part is also relatively long. Because the second branch is disposed in parallel with the first branch, and the second branch is shorter than the first branch, when a switch of the second branch is off, a third current on the second grounding branch selects the longer first branch as a path, an electrical length of the second grounding branch is greater than a quarter wavelength, and effective radiation is difficult to form. Therefore, a current return path of the antenna is the first grounding branch. When the switch of the second branch is on, the third current on the second grounding branch selects the shorter second branch as a path, an electrical length of the second grounding branch can be shortened to a quarter wavelength to perform effective radiation, and both the second grounding branch and the first grounding branch serve as current return paths of the antenna.

In an optional embodiment, the antenna is configured to form a first current. The first current is an antenna current. A flow direction of the first current varies with a shape direction of the antenna. The antenna includes a feeding end and an end away from the feeding end. The feeding end is connected to the feeding pad by using a conductive member to be coupled to the feeding part. The first current extends from the feeding end to the end a direction of the first current is from the connecting section of the earphone handle part to the top section of the earphone handle part. The antenna may be a quarter-wavelength antenna, to have relatively high antenna efficiency. An electrical length of the antenna may be implemented by adjusting a physical length of the antenna.

When the switch is off, the first grounding branch is configured to form a second current, and the second current and the first current are capable of composing into an equivalent current in resonant mode. When the switch is off, the first grounding branch serves as a current return path of the antenna. When an electrical length of the first current is a quarter wavelength and an electrical length of the second current is a quarter wavelength, an electrical length of an equivalent current composed by the first current and the second current is a half wavelength, and the equivalent current is in resonant mode, so that an antenna signal is effectively radiated. The equivalent current extends from the earbud part to the top section of the earphone handle part.

In this embodiment, because the direction of the first current is from the connecting section of the earphone handle part to the top section of the earphone handle part, and the direction of the second current is from the earbud part to the connecting section of the earphone handle part, the direction of the equivalent current composed by the first current and the second current is from the earbud part to the top section of the earphone handle part. Therefore, when a user wears the bluetooth earphone, a radiation null of a radiation field pattern of the antenna of the bluetooth earphone is toward the user head, thereby greatly reducing an adverse effect of the user head to the antenna and enabling the antenna to have better antenna performance.

When the switch is on, the first grounding branch is configured to form a second current, the second grounding branch is configured to form a third current, and the first current, the second current, and the third current are capable of composing into an equivalent current in resonant mode. When the switch is on, the first grounding branch and the second grounding branch serve as current return paths. When an electrical length of the first current is a quarter wavelength, an electrical length of the second current is a quarter wavelength, and an electrical length of the third current is a quarter wavelength, an electrical length of an equivalent current composed by the first current, the second current, and the third current is a three-quarter wavelength, and the equivalent current is in resonant mode, so that an antenna signal is effectively radiated. The equivalent current extends from the underside of the earbud part (namely, the side near the bottom section of the earphone handle part) to the top section of the earphone handle part.

In an optional embodiment, the circuit board further includes a third end part and a third connection part. The third end part is located at the connecting section of the earphone handle part or at an end of the bottom section of the earphone handle part that is close to the connecting section of the earphone handle part, and the third end part is connected to or close to the second connection part. When the third end part is connected (for example, welded or connected by conductive adhesive) to the second connection part, an electrical connection is formed therebetween. That the third end part is disposed close to the second connection part means that the third end part touches the second connection part, or that the third end part does not touch the second connection part, but a small gap exists therebetween, and electrical coupling is formed between the third end part and the second connection part. One end of the third connection part is connected to the third end part and the other end is connected to the feeding part or the first connection part. One end of the second branch that is away from the ground plane extends to the third end part by using the third connection part.

In this embodiment, the second branch located at the third connection part and the third end part can effectively shorten an electrical length of the second grounding branch, to meet an electrical length requirement.

In an optional embodiment, the earpiece module is connected to the first grounding branch. The first grounding branch may serve as a current return path of the antenna and may also serve as a reference ground for a low frequency signal of the earpiece module. The first microphone module is connected to the second grounding branch. The second grounding branch may serve as a current return path of the antenna and may also serve as a reference ground for a low frequency signal of the first microphone module.

In an optional embodiment, the first grounding branch is connected in series to a first low-pass high-resistance element. The second grounding branch is connected in series to a second low-pass high-resistance element, and the second low-pass high-resistance element is disposed in series with the first branch and is located at a side of the first branch that is away from the ground plane. The first low-pass high-resistance element and the second low-pass high-resistance element are configured to allow passage of a current whose frequency band is lower than a bluetooth signal frequency band and prevent passage of a current whose frequency band is close to the bluetooth signal frequency band.

DETAILED DESCRIPTION OF THE EMBODIMENTS

The following describes embodiments with reference to the accompanying drawings.

A bluetooth earphone in the embodiments has a plurality of ground structures. Different current return paths are selected for the antenna by switching the ground structures, to switch radiation patterns of the antenna. The radiation patterns of the antenna in the plurality of ground structures are complementary. Therefore, the antenna has no obvious null in each radiation direction, and antenna gains of the antenna in all directions are relatively even, thereby improving communication quality and resolving a problem of poor communication experience caused by low gains of the antenna at some angles.

Figure 1:
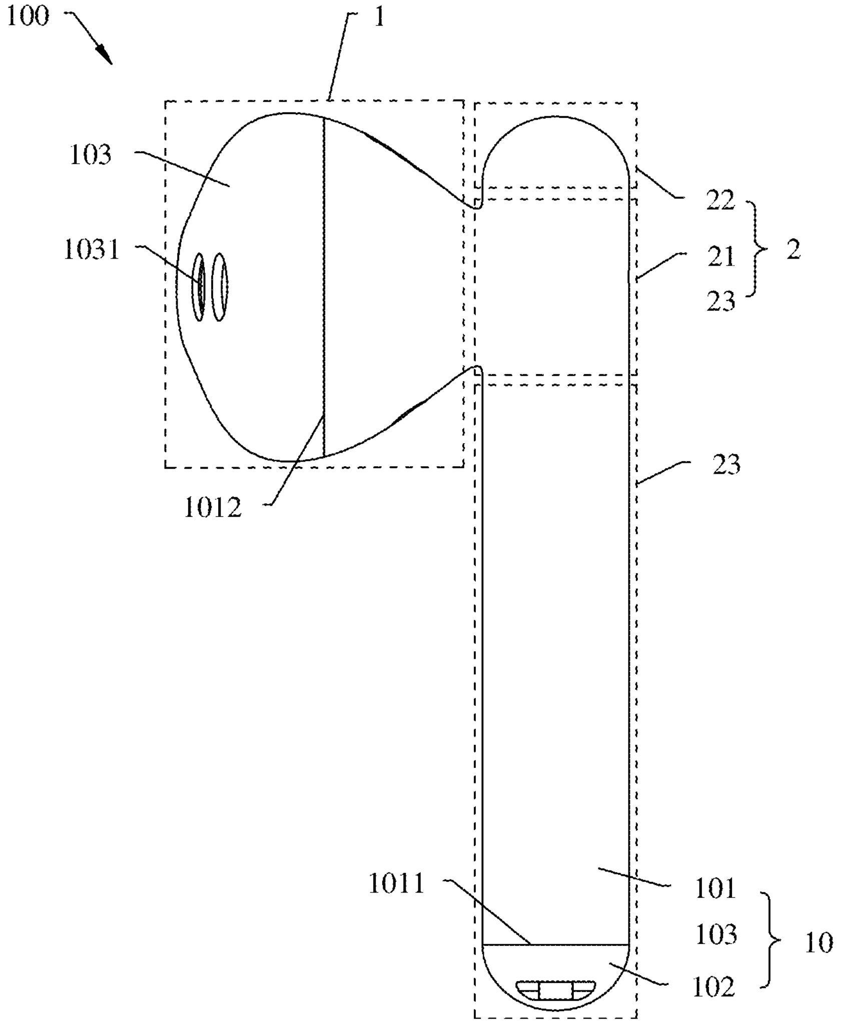
FIG. 1 is a schematic diagram of a structure of a bluetooth earphone according to an embodiment.

FIG. 1 is a schematic diagram of a structure of a bluetooth earphone 100 according to an embodiment.

The bluetooth earphone 100 has an earbud part 1 and an earphone handle part 2. The earphone handle part 2 includes a connecting section 21 connected to the earbud part 1, and a top section 22 and a bottom section 23 located at both sides of the connecting section 21. The top section 22, the connecting section 21, and the bottom section 23 of the earphone handle part 2 are arranged sequentially. The earbud part 1 is configured to be partially inserted into a user ear. The earphone handle part 2 is configured to touch the user ear. When a user wears the bluetooth earphone 100, the earbud part 1 is partially inserted in the user ear, and the earphone handle part 2 is located outside the user ear and touches the user ear.

Figure 2:
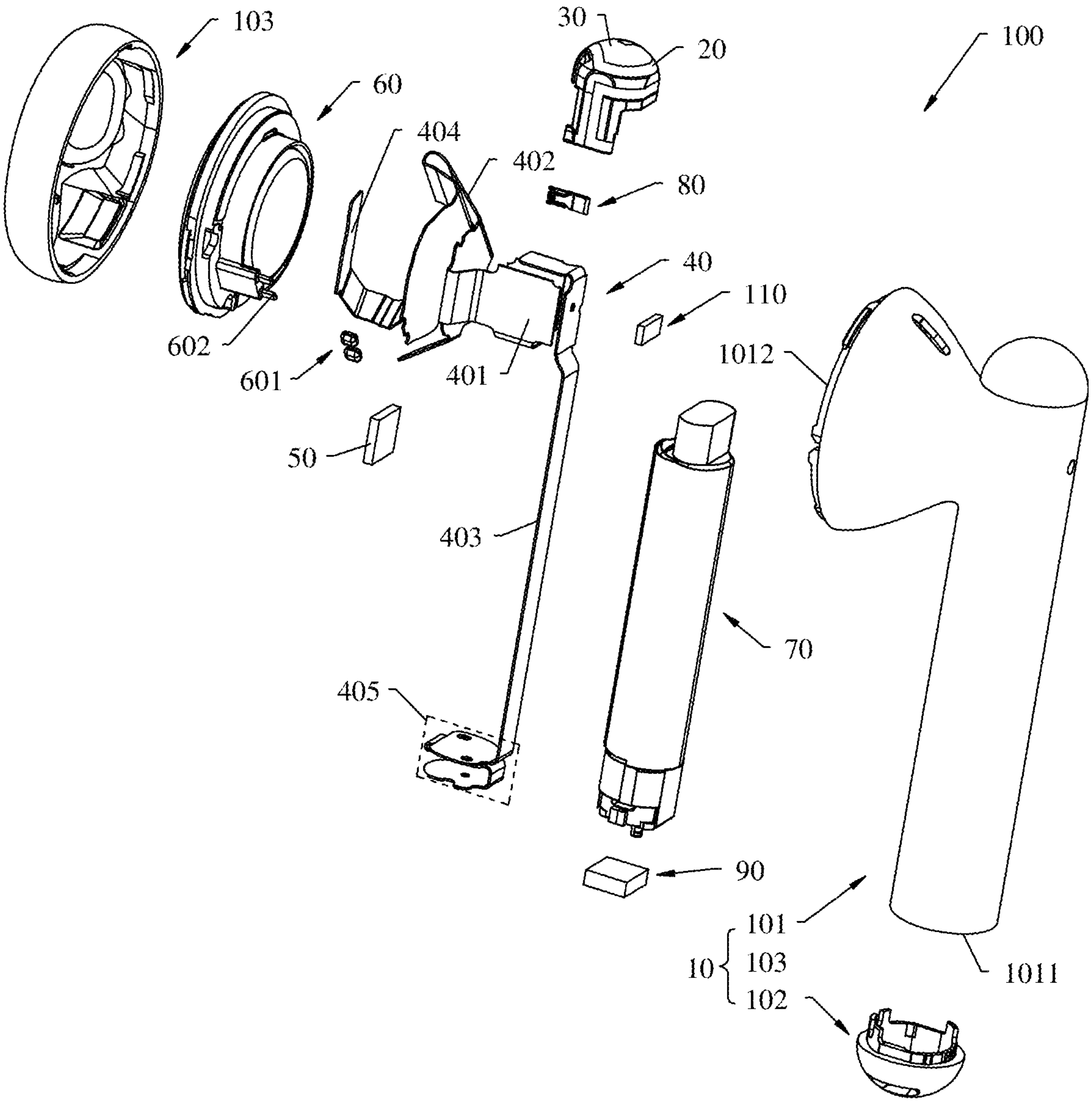
FIG. 2 is a partial exploded schematic diagram of the bluetooth earphone shown in FIG. 1.

FIG. 2 is a partial exploded schematic diagram of the bluetooth earphone 100 shown in FIG. 1. The bluetooth earphone 100 includes a housing 10. The housing 10 is configured to accommodate other components of the bluetooth earphone 100, to fasten and protect the other components. The housing 10 includes a main housing 101, a bottom housing 102, and a side housing 103. The main housing 101 is partially disposed on the earphone handle part 2 of the bluetooth earphone 100, and partially disposed on the earbud part 1 of the bluetooth earphone 100. The main housing 101 is provided with a first opening 1011 at the bottom section 23 of the earphone handle part 2 of the bluetooth earphone 100, and a second opening 1012 at the earbud part 1 of the bluetooth earphone 100. Another component of the bluetooth earphone 100 may be installed into the main housing 101 through the first opening 1011 or the second opening 1012. The bottom housing 102 is located at the bottom section 23 of the earphone handle part 2 of the bluetooth earphone 100 and fixedly connected to the main housing 101. The bottom housing 102 is mounted to the first opening 1011. The side housing 103 is located at the earbud part 1 of the bluetooth earphone 100 and fixedly connected to the main housing 101. The side housing 103 is mounted to the second opening 1012.

The connection between the bottom housing 102 and the main housing 101 is a detachable connection (for example, a snap-fit connection or a threaded connection), to facilitate subsequent fix or maintenance of the bluetooth earphone 100. In another implementation, the connection between the bottom housing 102 and the main housing 101 may be a non-detachable connection (for example, a glue connection), to reduce a risk of accidental falling off of the bottom housing 102 and make the bluetooth earphone 100 more reliable.

The connection between the side housing 103 and the main housing 101 is a detachable connection (for example, a snap-fit connection or a threaded connection), to facilitate subsequent fix or maintenance of the bluetooth earphone 100. In another embodiment, the connection between the side housing 103 and the main housing 101 may be a non-detachable connection (for example, a glue connection), to reduce a risk of accidental falling off of the side housing 103 and make the bluetooth earphone 100 more reliable.

The side housing 103 is provided with one or more sound outlets 1031, so that sound inside the housing 10 can be transmitted to the outside of the housing 10 through the sound outlet 1031. A shape, a location, a quantity, and the like of the sound outlet 1031 are not strictly limited.

Figure 3:
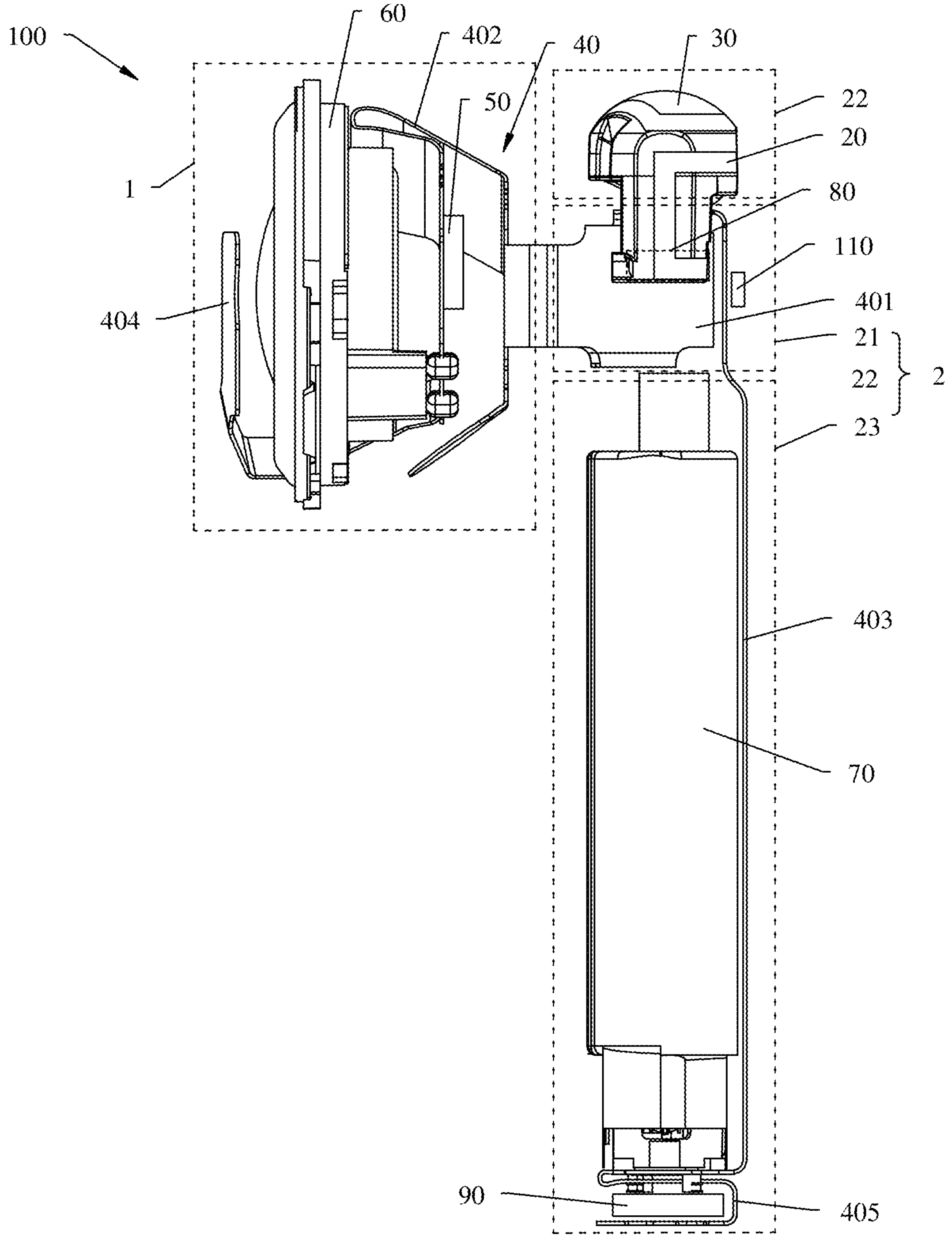
FIG. 3 is a schematic diagram of an internal structure of the bluetooth earphone shown in FIG. 1.

FIG. 3 is a schematic diagram of an internal structure of the bluetooth earphone 100 shown in FIG. 1.

The bluetooth earphone 100 further includes an antenna 20, an antenna holder 30, a circuit board 40, a chip 50, an earpiece module 60, a battery 70, a conductive member 80, a first microphone module 90, and a second microphone module 110.

The antenna 20 extends from the connecting section 21 of the earphone handle part 2 to the top section 22 of the earphone handle part 2. Optionally, the antenna 20 may be a monopole antenna, an inverted F-shaped antenna (IFA), or the like. Optionally, the antenna 20 may be a ceramic antenna, a circuit board antenna, a steel sheet antenna, a laser direct structuring (LDS) antenna, an in-mold injection molding antenna, or the like. In this embodiment, an example in which the antenna 20 is a laser direct structuring antenna is used for description.

The antenna holder 30 extends from the connecting section 21 of the earphone handle part 2 to the top section 22 of the earphone handle part 2. The antenna holder 30 is configured to fasten and support the antenna 20. In this embodiment, the antenna 20 is formed on the antenna holder 30. For example, the antenna 20 is formed on the antenna holder 30 after a coating process and a baking process that are alternately performed for a plurality of cycles. In one example, the antenna 20 is formed by alternating three coating processes and three baking processes to improve a product yield. In another embodiment, the antenna 20 may be fastened to the antenna holder 30 in an assembly manner. For example, the antenna 20 is welded or bonded to the antenna holder 30.

For example, a material of the antenna holder 30 may be ceramic. In this case, a relatively high dielectric constant of the ceramic can effectively reduce the size of the antenna 20. In another embodiment, the material of the antenna holder 30 may be plastic.

In some embodiments, as shown in FIG. 2 and FIG. 3, the circuit board 40 extends from the earbud part 1, through the connecting section 21 of the earphone handle part 2, to the bottom section 23 of the earphone handle part 2. The circuit board 40 may form one or more bent structures at the earbud part 1 and the earphone handle part 2. The circuit board 40 is configured to transmit a signal. The circuit board 40 may be an integrally formed flexible printed circuit (FPC) board, or an integrally formed soft-hard-composed circuit board, or an integral structure formed by connecting a plurality of flexible printed circuit boards to each other, or an integral structure formed by connecting one or more flexible printed circuit boards and one or more hard circuit boards. A type of the circuit board 40 is not strictly limited.

For example, the circuit board 40 includes a feeding part 401, a first connection part 402, a second connection part 403, a first end part 404, and a second end part 405. The feeding part 401 is located at the connecting section 21 of the earphone handle part 2. The first end part 404 and the second end part 405 are two end parts of the circuit board 40. The first end part 404 is located at the earbud part 1. The second end part 405 is located at the bottom section 23 of the earphone handle part 2. The first connection part 402 connects the feeding part 401 and the first end part 404. The first connection part 402 extends to the earbud part 1. A large part of the first connection part 402 is located at the earbud part 1, and a small part is located at the earphone handle part 2; or the first connection part 402 is not located at the earphone handle part 2. The second connection part 403 connects the feeding part 401 and the second end part 405. The second connection part 403 extends from the connecting section 21 of the earphone handle part 2 to the bottom section 23 of the earphone handle part 2.

In this embodiment, the first connection part 402 and the second connection part 403 are connected to two sides of the feeding part 401 respectively. One side of the feeding part 401 that is connected to the first connection part 402 and another side of the feeding part 401 that is connected to the second connection part 403 may be disposed adjacently or oppositely. In this case, the circuit board 40 can be well arranged inside the bluetooth earphone 100 according to a shape of the bluetooth earphone 100.

For example, the circuit board 40 may include one or more reinforcing plates (not shown in the figure). The one or more reinforcing plates are provided at a reinforcing region of the circuit board 40. The reinforcing region of the circuit board 40 is a region in the circuit board 40 that needs to be connected to another component, or a region configured to carry another component.

In some embodiments, as shown in FIG. 2 and FIG. 3, the conductive member 80 is located at the connecting section 21 of the earphone handle part 2. The conductive member 80 is fastened to the feeding part 401 of the circuit board 40 and configured to connect to the antenna 20 located at the antenna holder 30. For example, the conductive member 80 may be a conductive spring. In another embodiment, the conductive member 80 may be another structure, such as conductive adhesive. In another embodiment, the conductive member 80 may be replaced by a capacitor, and the feeding part 401 is coupled to the antenna 20 by the capacitor.

In some embodiments, as shown in FIG. 2 and FIG. 3, the chip 50 is located at the earbud part 1. The chip 50 is fastened to the first connection part 402 of the circuit board 40. The chip 50 may be fastened by welding and electrically connected to the circuit board 40. The chip 50 may be a processing and control center for the bluetooth earphone 100. The chip 50 is coupled to a plurality of functional modules of the bluetooth earphone 100 by using the circuit board 40, to control the plurality of functional modules to work. For example, the chip 50 may be a system on chip (SOC).

In some embodiments, as shown in FIG. 2 and FIG. 3, the earpiece module 60 is located at the earbud part 1. The earpiece module 60 is connected to the first connection part 402 of the circuit board 40. The earpiece module 60 is coupled to the chip 50. The earpiece module 60 is configured to convert an electrical signal into a sound signal. The earpiece module 60 is located at a side of the chip 50 that is away from the earphone handle part 2. In this case, the earpiece module 60 is closer to the outside of the bluetooth earphone 100, and a sound signal formed by the earpiece module 60 is more easily output to the outside of the bluetooth earphone 100. The bluetooth earphone 100 may further include a fixed terminal pair 601. The fixed terminal pair 601 is located at the earbud part 1. The fixed terminal pair 601 is fixedly connected to the first connection part 402 of the circuit board 40. A connection terminal 602 of the earpiece module 60 is inserted to the fixed terminal pair 601 to electrically connect the circuit board 40.

In some embodiments, as shown in FIG. 2 and FIG. 3, the battery 70 is located at the bottom section 23 of the earphone handle part 2. The battery 70 is connected to the second end part 405 of the circuit board 40. The battery 70 is coupled to the chip 50. The battery 70 is configured to supply power to the bluetooth earphone 100. In this embodiment, the battery 70 is in a strip shape to be better accommodated in the main housing 101. In another embodiment, the battery 70 may be in another shape. In some other embodiments, the battery 70 may be connected to the second connection part 403 of the circuit board 40.

In some embodiments, as shown in FIG. 2 and FIG. 3, the first microphone module 90 is located at the bottom section 23 of the earphone handle part 2. The first microphone module 90 may be located at a side of the battery 70 that is away from the antenna 20. The first microphone module 90 is connected to the second end part 405 of the circuit board 40. The first microphone module 90 is coupled to the chip 50. The first microphone module 90 is configured to convert a sound signal into an electrical signal.

The second microphone module 110 is located at the connecting section 21 of the earphone handle part 2. The second microphone module 110 is located at a side of the battery 70 that is close to the antenna 20. The second microphone module 110 is connected to the second connection part 403 of the circuit board 40. The second microphone module 110 is coupled to the chip 50. The second microphone module 110 is configured to convert a sound signal into an electrical signal. The second microphone module 110 and the first microphone module 90 may cooperate to improve speech recognition accuracy of the bluetooth earphone 100. Alternatively, the second microphone module 110 and the first microphone module 90 may work independently.

It may be understood that components of the bluetooth earphone 100 are not limited to the foregoing functional modules, and the bluetooth earphone 100 may include more functional modules (for example, a proximity sensor module or a bone vibration module) or fewer functional modules. This is not strictly limited.

Figure 4:
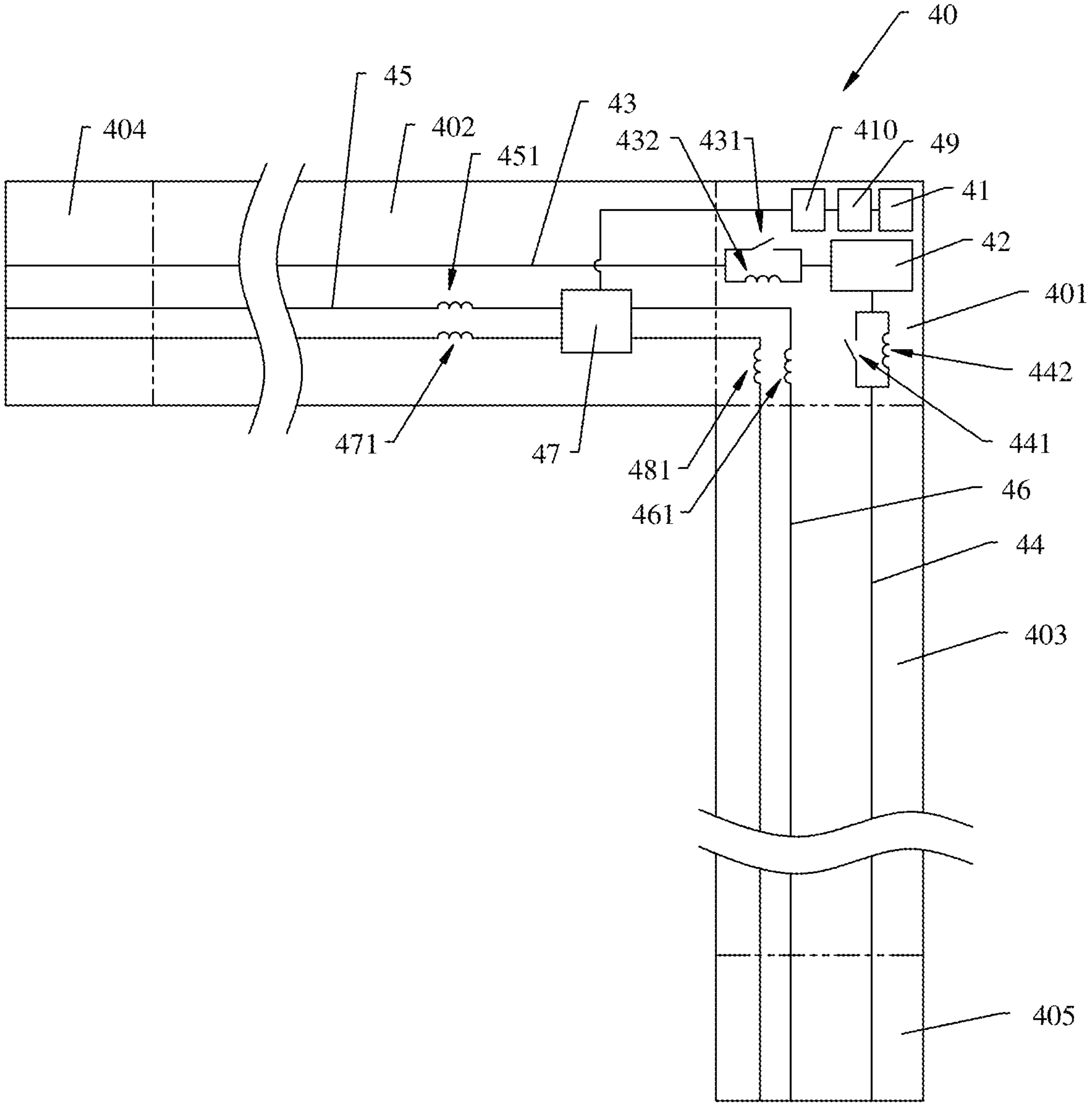
FIG. 4 is a schematic diagram of a structure of a circuit board shown in FIG. 2 in an embodiment.

FIG. 4 is a schematic diagram of a structure of the circuit board 40 shown in FIG. 2 in an embodiment. FIG. 4 is a simple schematic diagram of a structure when the circuit board 40 is in a flat state and does not define a shape of the circuit board 40.

The circuit board 40 includes a feeding pad 41, a ground plane 42, a first grounding branch 43, and a second grounding branch 44. The feeding pad 41 is located at a feeding part 401. The feeding pad 41 is configured to fasten a conductive member 80 to be coupled to an antenna 20. The ground plane 42 is located at the feeding part 401 and spaced from the feeding pad 41. The ground plane 42 is grounded and serves as a part of a current return path of the antenna 20. For example, the ground plane 42 and the feeding pad 41 are located at different conductive layers of the circuit board 40 to form a gap therebetween. For example, the feeding pad 41 is located at a surface conductive layer of the circuit board 40, and the ground plane 42 is located at an inner conductive layer or another surface conductive layer of the circuit board 40. In some other embodiments, the ground plane 42 and the feeding pad 41 may be located at a same layer and form a gap therebetween, so as not to touch each other.

One end of the first grounding branch 43 is connected to the ground plane 42 and the other end extends to the first end part 404. The first grounding branch 43 is connected in series to a first switch 431. When the first switch 431 is on, the first grounding branch 43 is configured to form a ground current, and the first grounding branch 43 serves as a part of the current return path of the antenna 20. When the first switch 431 is off, the first switch 431 cuts off a current on the first grounding branch 43, and the first grounding branch 43 does not provide an effective current return path for the antenna 20.

One end of the second grounding branch 44 is connected to the ground plane 42 and the other end extends to the second end part 405. The second grounding branch 44 is connected in series to a second switch 441. When the second switch 441 is on, the second grounding branch 44 is configured to form a ground current, and the second grounding branch 44 serves as a part of the current return path of the antenna 20. When the second switch 441 is off, the second switch 441 cuts off a current on the second grounding branch 44, and the second grounding branch 44 does not provide an effective current return path for the antenna 20.

In this embodiment, the bluetooth earphone 100 may form a plurality of ground structures by controlling states (on or off) of the first switch 431 and the second switch 441, and select different grounding branches, in other words, select different current return paths, for the antenna 20 by switching the ground structures, to switch radiation patterns of the antenna. The radiation patterns of the antenna 20 in the plurality of ground structures are complementary. Therefore, the antenna 20 has no obvious null in each radiation direction, and antenna gains of the antenna 20 in all directions are relatively even, thereby improving communication quality and resolving a problem of poor communication experience caused by low gains of the antenna at some angles.

Figure 5:
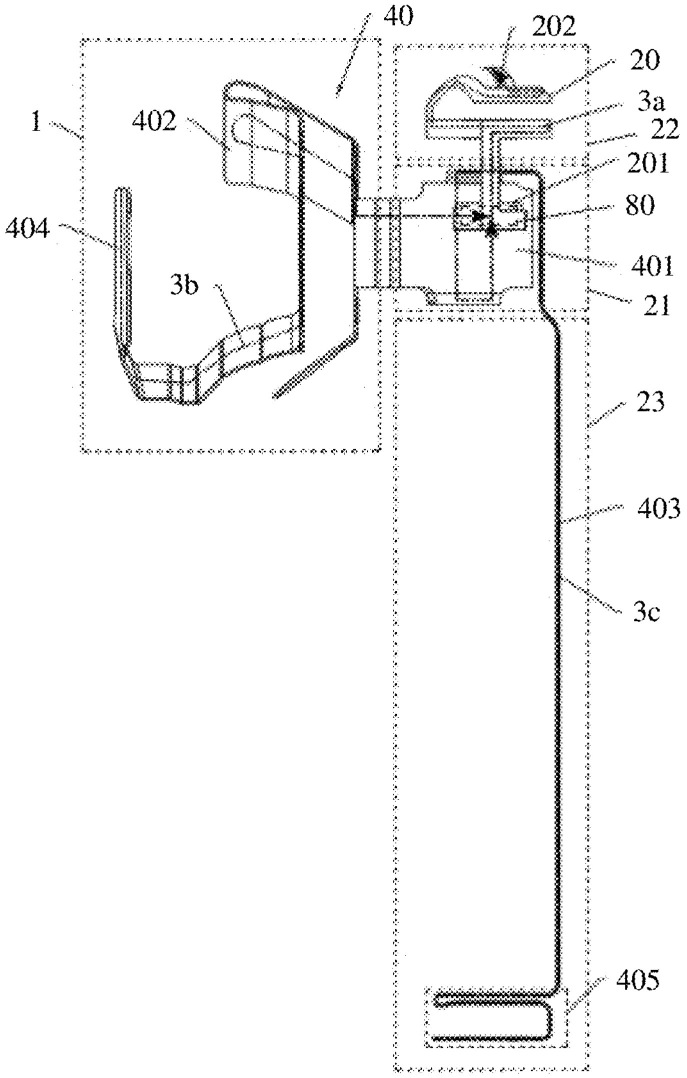
FIG. 5 is a schematic current diagram of a partial structure of the bluetooth earphone shown in FIG. 3.
Figure 6:
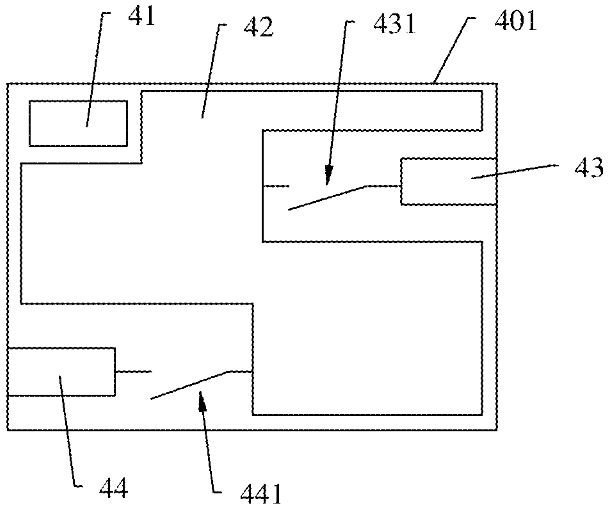
FIG. 6 is a schematic diagram of a partial structure of a feeding part of the circuit board shown in FIG. 4 in some embodiments.

FIG. 5 is a schematic current diagram of a partial structure of the bluetooth earphone 100 shown in FIG. 3, and FIG. 6 is a schematic diagram of a partial structure of the feeding part 401 of the circuit board 40 shown in FIG. 4 in some embodiments.

As shown in FIG. 4 and FIG. 5, the antenna 20 is configured to form a first current 3*a*. The first current 3*a* is an antenna current. A flow direction of the first current 3*a* varies with a shape direction of the antenna 20. The antenna 20 includes a feeding end 201 and an end 202 away from the feeding end 201. The feeding end 201 is connected to the feeding pad 41 by using a conductive member 80 to be coupled to the feeding part 401. The first current 3*a* extends from the feeding end 201 to the end 202 and a direction of the first current 3*a* is from the connecting section 21 of the earphone handle part 2 to the top section 22 of the earphone handle part 2.

The antenna 20 may be a quarter-wavelength antenna, to have relatively high antenna efficiency. An electrical length of the antenna 20 may be implemented by adjusting a physical length of the antenna 20. For example, the antenna 20 has a spiral shape, to overcome a problem that insufficient space of the top section 22 of the earphone handle part 2 increases the length of the antenna 20, so that the electrical length of the first current 3*a* formed on the antenna 20 can satisfy the quarter wavelength requirement. Further, the physical length of the antenna 20 may be changed by changing a winding loop quantity, a winding density, a winding shape, and the like of the antenna 20. In another embodiment, the antenna 20 may be provided in a structure having a plurality of layers of stacked antenna segments. A shape of the antenna 20 is not strictly limited.

As shown in FIG. 4 and FIG. 5, when the first switch 431 is on, the first grounding branch 43 is configured to form a second current 3*b*. The second current 3*b* is a ground current. The second current 3*b* extends from an end of the first grounding branch 43 that is away from the ground plane 42 to the ground plane 42. The second current 3*b* extends from a first end part 404 of the circuit board 40 to the feeding part 401, and a direction of the second current 3*b* is from the earbud part 1 to the connecting section 21 of the earphone handle part 2. A flow direction of the second current 3*b* varies with a shape direction of the circuit board 40.

In some embodiments, when the first switch 431 is on, an electrical length of the first grounding branch 43 is or is close to a quarter wavelength, so that the second current 3*b* is in resonant mode and effective radiation can be formed. The first switch 431 may be located at the feeding part 401 (as shown in FIG. 4 and FIG. 6) of the circuit board 40 or located at an end of the first connection part 402 that is close to the feeding part 401. In this case, an electrical length of a part of the first grounding branch 43 that is located between the first switch 431 and the ground plane 42 is less than a quarter wavelength, a current on the part is not in resonant mode, and effective radiation cannot be formed. It may be understood that, in some other embodiments, the first switch 431 may be located elsewhere, provided that the electrical length of the part of the first grounding branch 43 that is located between the first switch 431 and the ground plane 42 is not equal to N/4 wavelengths, where N is a positive integer.

As shown in FIG. 4 and FIG. 5, when the second switch 441 is on, the second grounding branch 44 is configured to form a third current 3*c*. The third current 3*c* is a ground current. The third current 3*c* extends from an end of the second grounding branch 44 that is away from the ground plane 42 to the ground plane 42. The third current 3*c* extends from a second end part 405 of the circuit board 40 to the feeding part 401, and a direction of the third current 3*c* is from the bottom section 23 of the earphone handle part 2 to the connecting section 21 of the earphone handle part 2. A flow direction of the third current 3*c* varies with a shape direction of the circuit board 40.

In some embodiments, when the second switch 441 is on, an electrical length of the second grounding branch 44 is or is close to a quarter wavelength, so that the third current 3*c* is in resonant mode and effective radiation can be formed. The second switch 441 may be located at the feeding part 401 (as shown in FIG. 4 and FIG. 6) of the circuit board 40 or located at an end of the second connection part 403 that is close to the feeding part 401, for example, located between the chip 50 and the ground plane 42. In this case, an electrical length of a part of the first grounding branch 43 that is located between the first switch 431 and the ground plane 42 is less than a quarter wavelength, a current on the part is not in resonant mode, and effective radiation cannot be formed. It may be understood that, in some other embodiments, the second switch 441 may be located elsewhere, provided that the electrical length of the part of the first grounding branch 43 that is located between the first switch 431 and the ground plane 42 is not equal to N/4 wavelengths, where N is a positive integer.

It may be understood that, because the first current 3*a* is an alternating current, directions of the first current 3*a*, the second current 3*b*, and the third current 3*c* may have two states. FIG. 5 illustrates one state. In the other state, the direction of the first current 3*a* is from the top section 22 of the earphone handle part 2 to the connecting section 21 of the earphone handle part 2, the direction of the second current 3*b* is from the connecting section 21 of the earphone handle part 2 to the earbud part 1, and the direction of the third current 3*c* is from the connecting section 21 of the earphone handle part 2 to the bottom section 23 of the earphone handle part 2.

It may be understood that, in the embodiments, carrier media of the first current 3*a*, the second current 3*b*, and the third current 3*c* each with an electrical length of a quarter wavelength (namely, the antenna 20, the first grounding branch 43, and the second grounding branch 44) are affected by a medium around paths of the antenna 20, the first grounding branch 43, and the second grounding branch 44, each with an actual physical length smaller than a quarter wavelength.

Figure 7:
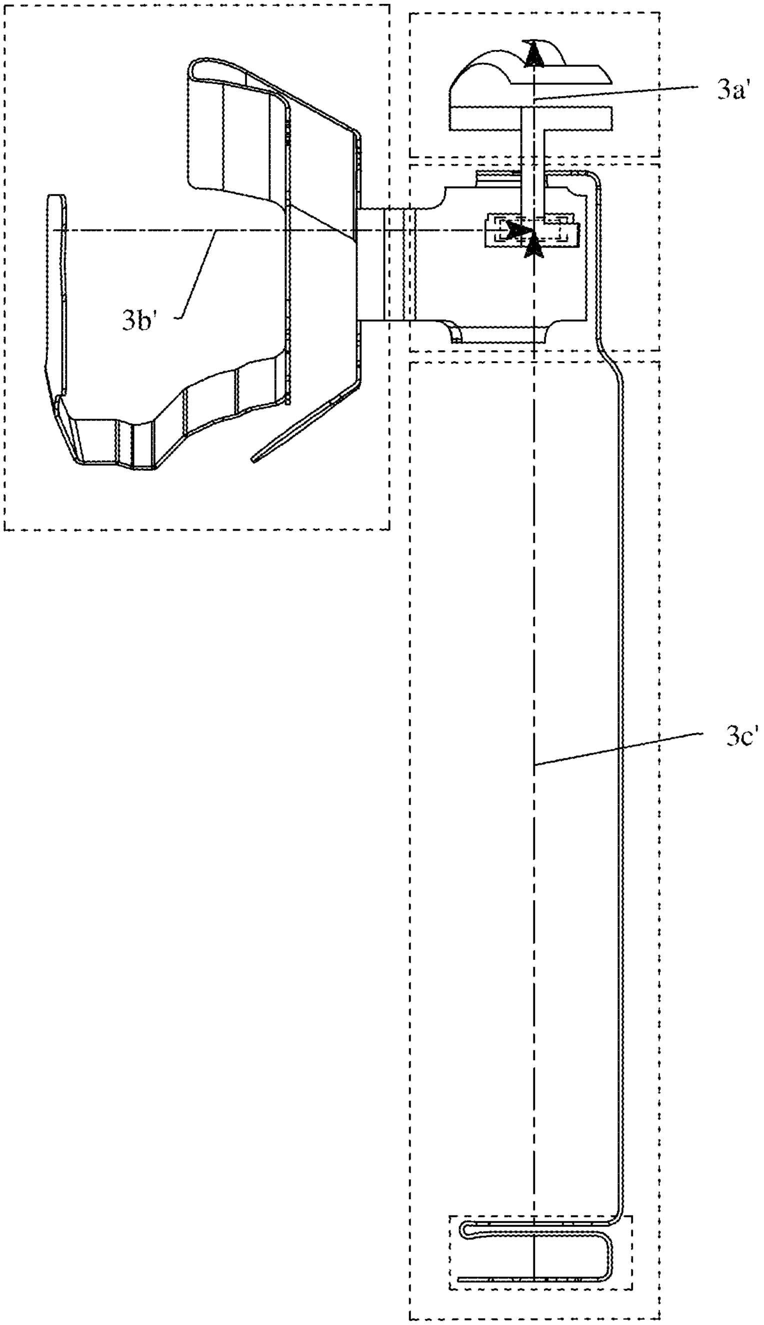
FIG. 7 is a schematic diagram of an equivalent current of the structure shown in FIG. 5.

FIG. 7 is a schematic diagram of an equivalent current of the structure shown in FIG. 5. For convenience of description below, the first current 3*a* is equivalent to a first equivalent current 3*a*' shown in FIG. 7, the second current 3*b* is equivalent to a second equivalent current 3*b*' shown in FIG. 7, and the third current 3*c* is equivalent to a third equivalent current 3*c*' shown in FIG. 7.

Figure 8:
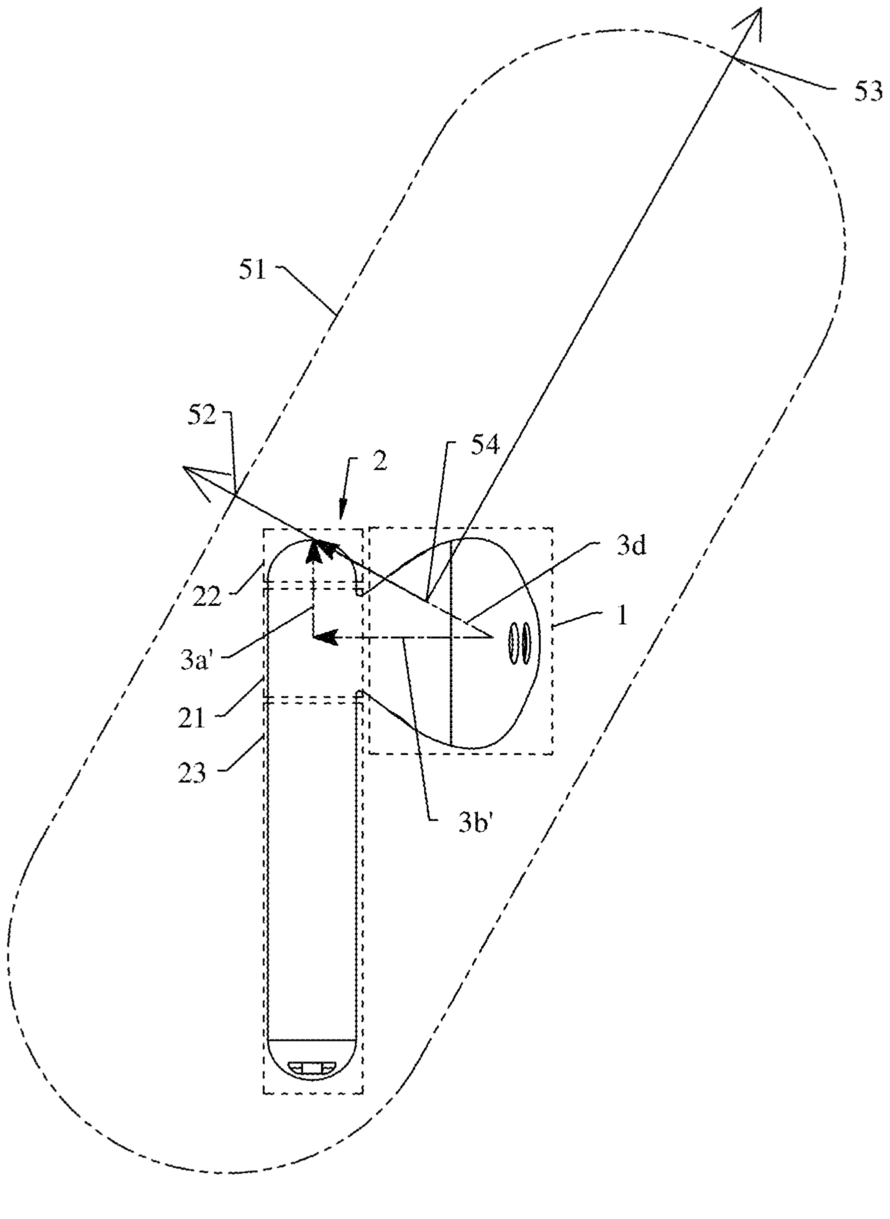
FIG. 8 is a schematic diagram of a radiation field pattern of the bluetooth earphone shown in FIG. 1 in a first ground structure of the circuit board shown in FIG. 4.

FIG. 8 is a schematic diagram of a radiation field pattern 51 of the bluetooth earphone 100 shown in FIG. 1 in a first ground structure of the circuit board 40 shown in FIG. 4.

When the first switch 431 of the circuit board 40 is on and the second switch 441 is off, the first ground structure is formed. The antenna 20 forms a first current 3*a*, the first current 3*a* is equivalent to a first equivalent current 3*a*' in FIG. 8, and the first equivalent current 3*a*' extends from the connecting section 21 of the earphone handle part 2 to the top section 22 of the earphone handle part 2. The first switch 431 is on and the second switch 441 is off, the first grounding branch 43 serves as a current return path, the first grounding branch 43 forms a second current 3*b*, the second current 3*b* is equivalent to a second equivalent current 3*b*' in FIG. 8, and the second equivalent current 3*b*' extends from the earbud part 1 to the connecting section 21 of the earphone handle part 2. The second current 3*b* and the first current 3*a* are capable of composing into an equivalent current 3*d* in resonant mode, and the equivalent current 3*d* extends from the earbud part 1 to the top section 22 of the earphone handle part 2.

When an electrical length of the first current 3*a* is a quarter wavelength and an electrical length of the second current 3*b* is a quarter wavelength, an electrical length of the equivalent current 3*d* composed by the first current 3*a* and the second current 3*b* is a half wavelength, and the equivalent current 3*d* is in resonant mode, so that an antenna signal is effectively radiated. When the circuit board 40 is in the first ground structure, the radiation field pattern 51 of the bluetooth earphone 100 is shown in FIG. 8. A line connecting a radiation null 52 of the radiation field pattern 51 and a central point 54 is parallel to the equivalent current 3*d*, and a line connecting a radiation intensity point 53 and the central point 54 is perpendicular to the equivalent current 3*d*.

In this embodiment, because the direction of the first current 3*a* is from the connecting section 21 of the earphone handle part 2 to the top section 22 of the earphone handle part 2, and the direction of the second current 3*b* is from the earbud part 1 to the connecting section 21 of the earphone handle part 2, the direction of the equivalent current 3*d* composed by the first current 3*a* and the second current 3*b* is from the earbud part 1 to the top section 22 of the earphone handle part 2. Therefore, when a user wears the bluetooth earphone 100, the radiation null 52 of the radiation field pattern 51 of the antenna 20 of the bluetooth earphone 100 is toward the user head, thereby greatly reducing an adverse effect of the user head to the antenna 20 and enabling the antenna 20 to have better antenna performance.

Figure 9:
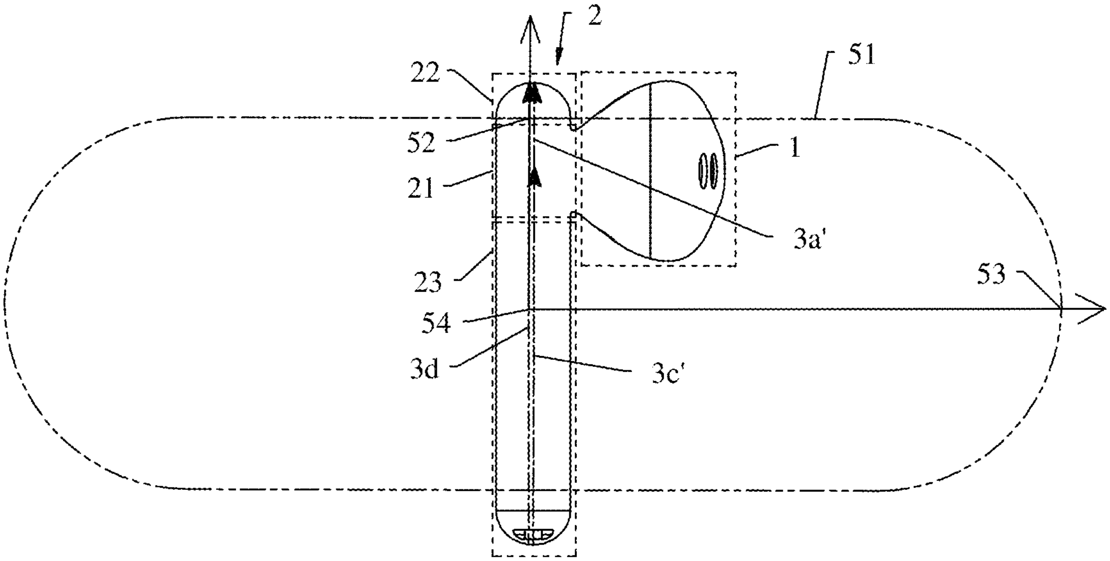
FIG. 9 is a schematic diagram of a radiation field pattern of the bluetooth earphone shown in FIG. 1 in a second ground structure of the circuit board shown in FIG. 4.

FIG. 9 is a schematic diagram of a radiation field pattern 51 of the bluetooth earphone 100 shown in FIG. 1 in a second ground structure of the circuit board 40 shown in FIG. 4. When the second switch 441 of the circuit board 40 is on and the first switch 431 is off, the second ground structure is formed. The antenna 20 forms a first current 3*a*, the first current 3*a* is equivalent to a first equivalent current 3*a*' in FIG. 9, and the first equivalent current 3*a*' extends from the connecting section 21 of the earphone handle part 2 to the top section 22 of the earphone handle part 2. When the second switch 441 is on and the first switch 431 is off, the second grounding branch 44 serves as a current return path, and the second grounding branch 44 forms a third current 3*c*. The third current 3*c* is equivalent to a third equivalent current 3*c*' in FIG. 9, and the third equivalent current 3*c*' extends from the bottom section 23 of the earphone handle part 2 to the connecting section 21 of the earphone handle part 2. The third current 3*c* and the first current 3*a* are capable of composing into an equivalent current 3*d* in resonant mode, and the equivalent current 3*d* extends from the bottom section 23 of the earphone handle part 2 to the top section 22 of the earphone handle part 2. In FIG. 9, for convenience of illustration, the equivalent current 3*d* is illustrated differently from the first equivalent current 3*a*' and the third equivalent current 3*c*'. Actually, the equivalent current 3*d*, the first equivalent current 3*a*', and the third equivalent current 3*c*' should be overlapping.

When an electrical length of the first current 3*a* is a quarter wavelength and an electrical length of the third current 3*c* is a quarter wavelength, an electrical length of the equivalent current 3*d* composed by the first current 3*a* and the third current 3*c* is a half wavelength, and the equivalent current 3*d* is in resonant mode, so that an antenna signal is effectively radiated. When the circuit board 40 is in the second ground structure, the radiation field pattern 51 of the bluetooth earphone 100 is shown in FIG. 9. A line connecting a radiation null 52 of the radiation field pattern 51 and a central point 54 is parallel to the equivalent current 3*d*, and a line connecting a radiation intensity point 53 and the central point 54 is perpendicular to the equivalent current 3*d*.

Figure 10:
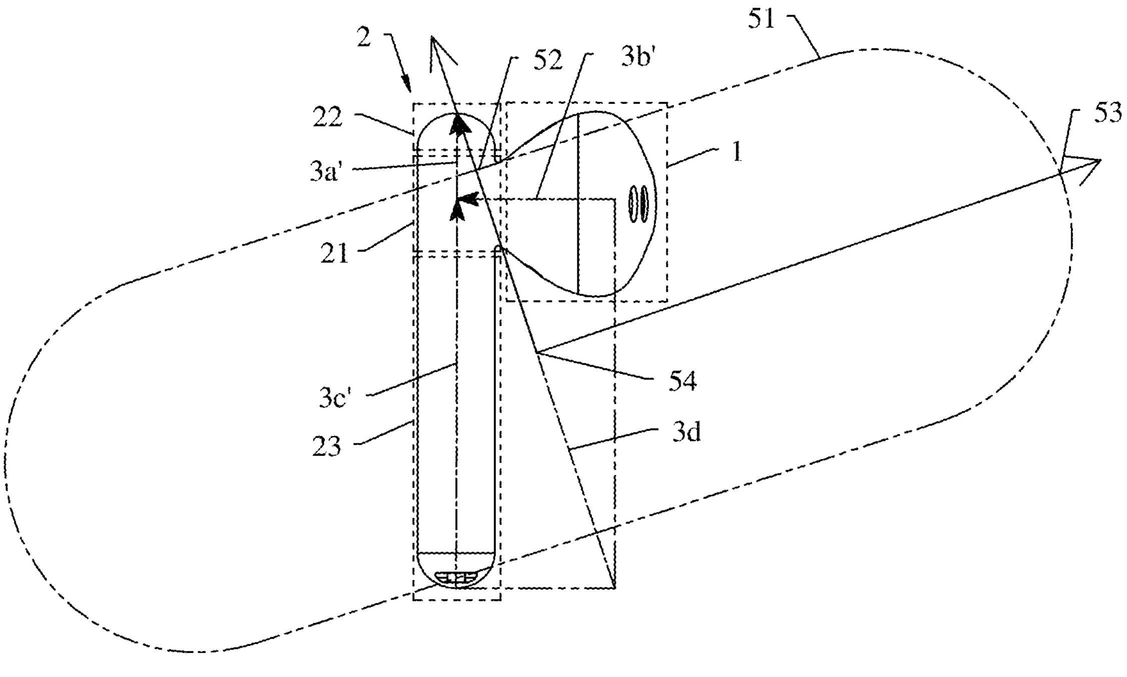
FIG. 10 is a schematic diagram of a radiation field pattern of the bluetooth earphone shown in FIG. 1 in a third ground structure of the circuit board shown in FIG. 4.

FIG. 10 is a schematic diagram of a radiation field pattern 51 of the bluetooth earphone 100 shown in FIG. 1 in a third ground structure of the circuit board 40 shown in FIG. 4. When the first switch 431 of the circuit board 40 is on and the second switch 441 is on, the third ground structure is formed. The antenna 20 forms a first current 3*a*, the first current 3*a* is equivalent to a first equivalent current 3*a*' in FIG. 10, and the first equivalent current 3*a*' extends from the connecting section 21 of the earphone handle part 2 to the top section 22 of the earphone handle part 2. When the first switch 431 is on and the second switch 441 is on, the first grounding branch 43 and the second grounding branch 44 serve as current return paths. The first grounding branch 43 forms a second current 3*b*, the second current 3*b* is equivalent to a second equivalent current 3*b*' in FIG. 10, and the second equivalent current 3*b*' extends from the earbud part 1 to the connecting section 21 of the earphone handle part 2. The second grounding branch 44 forms a third current 3*c*, the third current 3*c* is equivalent to a third equivalent current 3*c*' in FIG. 10, and the third equivalent current 3*c*' extends from the bottom section 23 of the earphone handle part 2 to the connecting section 21 of the earphone handle part 2. The first current 3*a*, the second current 3*b*, and the third current 3*c* are capable of composing into an equivalent current 3*d* in resonant mode, and the equivalent current 3*d* extends from the underside of the earbud part 1 (namely, the side near the bottom section 23 of the earphone handle part 2) to the top section 22 of the earphone handle part 2.

When an electrical length of the first current 3*a* is a quarter wavelength, an electrical length of the second current 3*b* is a quarter wavelength, and an electrical length of the third current 3*c* is a quarter wavelength, an electrical length of the equivalent current 3*d* composed by the first current 3*a*, the second current 3*b*, and the third current 3*c* is a three-quarter wavelength, and the equivalent current 3*d* is in resonant mode, so that an antenna signal is effectively radiated. When the circuit board 40 is in the third ground structure, the radiation field pattern 51 of the bluetooth earphone 100 is shown in FIG. 10. A line connecting a radiation null 52 of the radiation field pattern 51 and a central point 54 is parallel to the equivalent current 3*d*, and a line connecting a radiation intensity point 53 and the central point 54 is perpendicular to the equivalent current 3*d*.

With reference to FIG. 8 to FIG. 10, in different ground structures, the antenna 20 of the bluetooth earphone 100 forms equivalent currents 3*d* in different directions, and the radiation field patterns 51 formed by the antenna 20 are complementary. The bluetooth earphone 100 may switch the ground structures of the circuit board 40 to change locations of the radiation null 52 and the radiation intensity point 53 of the radiation field pattern 51 of the antenna 20. Therefore, the antenna 20 has no obvious radiation null 52 in a radiation direction, and antenna gains of the antenna 20 in all directions are relatively even, thereby improving communication quality.

It may be understood that, in some embodiments, the circuit board 40 shown in FIG. 4 may have the foregoing first and second ground structures. In this case, the first switch 431 and the second switch 441 may be single-pole single-throw switches independent of each other or may be integrated into a single-pole double-throw switch. In some other embodiments, the circuit board 40 shown in FIG. 4 may have the foregoing first, second, and third ground structures. In this case, the first switch 431 and the second switch 441 may be single-pole single-throw switches independent of each other.

Figure 11A:
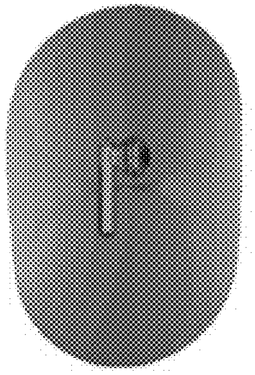
FIG. 11A is a simulation diagram of a radiation field pattern of a bluetooth earphone when the circuit board shown in FIG. 4 is switched to a first ground structure.
Figure 11B:
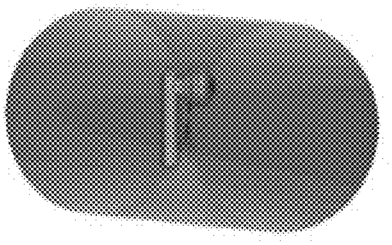
FIG. 11B is a simulation diagram of a radiation field pattern of a bluetooth earphone when the circuit board shown in FIG. 4 is switched to a second ground structure.
Figure 11C:
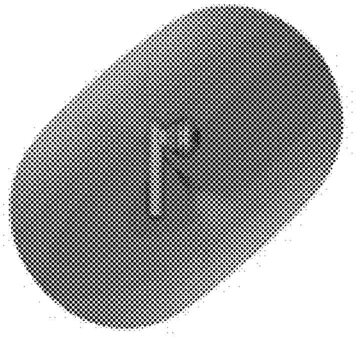
FIG. 11C is a simulation diagram of a radiation field pattern of a bluetooth earphone when the circuit board shown in FIG. 4 is switched to a third ground structure.

FIG. 11A is a simulation diagram of a radiation field pattern of the bluetooth earphone 100 when the circuit board 40 shown in FIG. 4 is switched to a first ground structure. FIG. 11B is a simulation diagram of a radiation field pattern of the bluetooth earphone 100 when the circuit board 40 shown in FIG. 4 is switched to a second ground structure. FIG. 11C is a simulation diagram of a radiation field pattern of the bluetooth earphone 100 when the circuit board 40 shown in FIG. 4 is switched to a third ground structure.

FIG. 11A to FIG. 11C illustrate again, by using simulation diagrams, the radiation field patterns of the antenna 20 of the bluetooth earphone 100 corresponding to the first ground structure, the second ground structure, and the third ground structure. The radiation field patterns of the antenna 20 corresponding to different ground structures are complementary.

As shown in FIG. 11A, when the circuit board 40 switches to the first ground structure, the second switch 441 is off, some currents on a part of the second grounding branch 44 that is between the second switch 441 and the ground plane 42 may participate in radiation, and a radiation participation proportion is obviously smaller than that of other currents in a resonance state (namely, the first current 3*a* and the second current 3*b*). Therefore, a direction of an effective radiation current (a composed current of all the radiation participation currents) of the antenna 20 rotates a little counterclockwise relative to the equivalent current 3*d* in FIG. 8. Adaptively, the direction of the radiation field pattern of the antenna 20 rotates counterclockwise relative to the radiation field pattern 51 in FIG. 8.

As shown in FIG. 11B, when the circuit board 40 switches to the second ground structure, the first switch 431 is off, some currents on a part of the first grounding branch 43 that is between the first switch 431 and the ground plane 42 may participate in radiation, and a radiation participation proportion is obviously smaller than that of other currents in a resonance state (namely, the first current 3*a* and the third current 3*c*). Therefore, a direction of an effective radiation current of the antenna 20 rotates a little clockwise relative to the equivalent current 3*d* in FIG. 9. Adaptively, the direction of the radiation field pattern of the antenna 20 rotates clockwise relative to the radiation field pattern 51 in FIG. 9.

Figure 12:
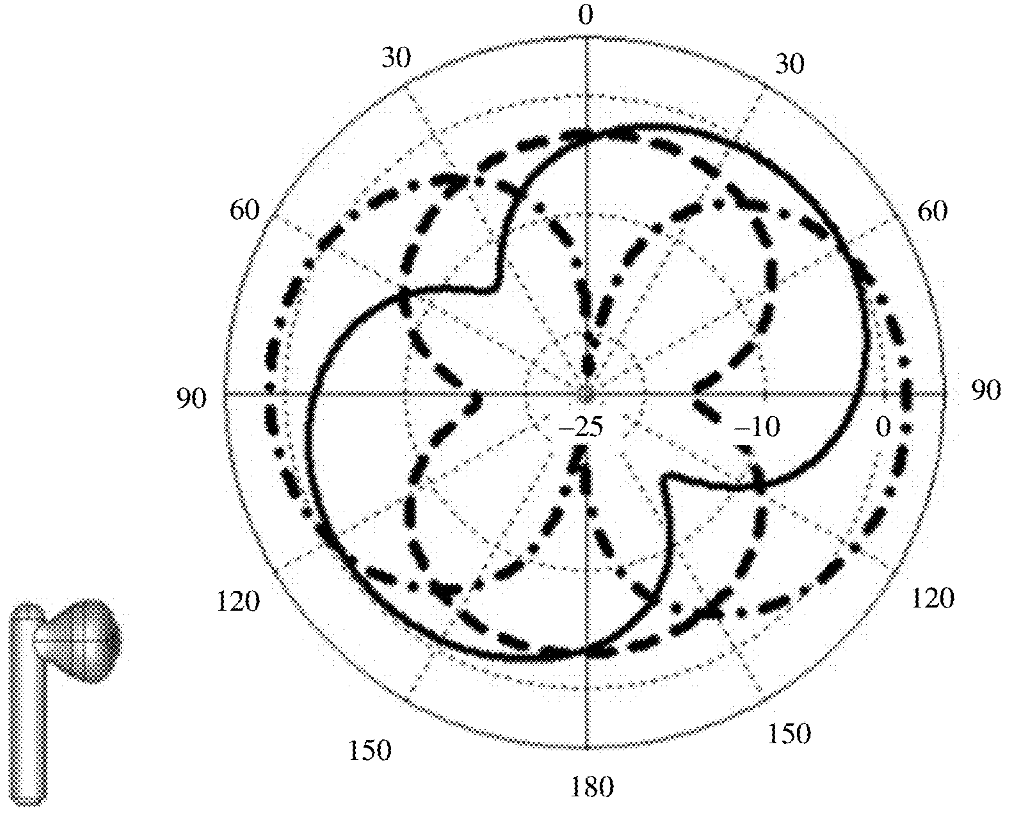
FIG. 12 is a comparison radiation pattern of a vertical section of the bluetooth earphone shown in FIG. 1 in free space in a plurality of ground structures of the circuit board shown in FIG. 4.

FIG. 12 is a comparison radiation pattern of a vertical section of the bluetooth earphone 100 shown in FIG. 1 in free space in a plurality of ground structures of the circuit board 40 shown in FIG. 4. In the radiation pattern of FIG. 12, a dashed outline illustrates a radiation pattern of the bluetooth earphone 100 corresponding to a first ground structure of the circuit board 40 shown in FIG. 4, a dot-dashed outline illustrates a radiation pattern of the bluetooth earphone 100 corresponding to a second ground structure of the circuit board 40 shown in FIG. 4, and a straight outline illustrates a radiation pattern of the bluetooth earphone 100 corresponding to a third ground structure of the circuit board 40 shown in FIG. 4.

FIG. 12 illustrates that the radiation field patterns of the antenna 20 of the bluetooth earphone 100 corresponding to the different ground structures are complementary. The bluetooth earphone 100 may change locations of the radiation null and the radiation intensity point of the radiation field pattern of the antenna 20 by switching the ground structures of the circuit board 40. Therefore, the antenna 20 has no obvious radiation null in a radiation direction, and antenna gains of the antenna 20 in all directions are relatively even, thereby improving communication quality.

Figure 13A:
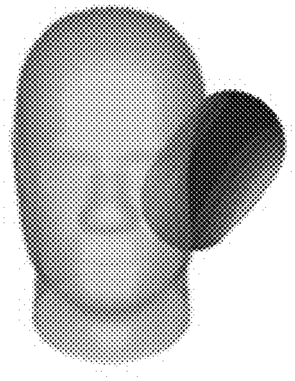
FIG. 13A is a simulation diagram of a radiation field pattern of a bluetooth earphone corresponding to a head mode in free space when the circuit board shown in FIG. 4 is switched to a first ground structure.
Figure 13B:
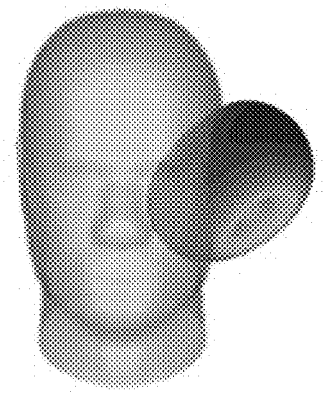
FIG. 13B is a simulation diagram of a radiation field pattern of a bluetooth earphone corresponding to a head mode in free space when the circuit board shown in FIG. 4 is switched to a second ground structure.
Figure 13C:
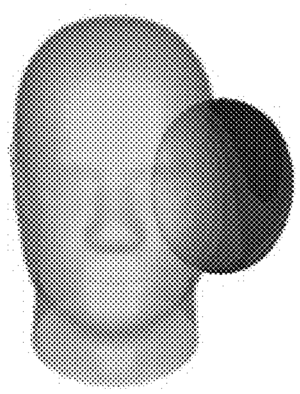
FIG. 13C is a simulation diagram of a radiation field pattern of a bluetooth earphone corresponding to a head mode in free space when the circuit board shown in FIG. 4 is switched to a third ground structure.
Figure 14A:
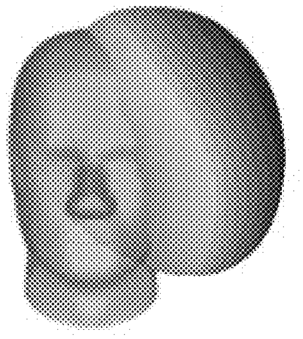
FIG. 14A is a simulation diagram of a radiation field pattern of a bluetooth earphone corresponding to a head mode when the circuit board shown in FIG. 4 is switched to a first ground structure.
Figure 14B:
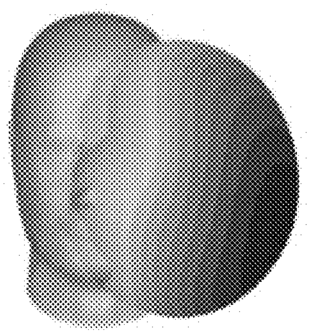
FIG. 14B is a simulation diagram of a radiation field pattern of a bluetooth earphone corresponding to a head mode when the circuit board shown in FIG. 4 is switched to a second ground structure.
Figure 14C:
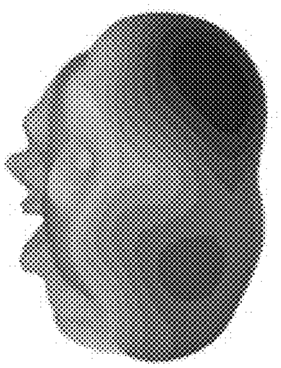
FIG. 14C is a simulation diagram of a radiation field pattern of a bluetooth earphone corresponding to a head mode when the circuit board shown in FIG. 4 is switched to a third ground structure.

FIG. 13A is a simulation diagram of a radiation field pattern of a bluetooth earphone 100 corresponding to a head mode in free space when the circuit board 40 shown in FIG. 4 is switched to a first ground structure. FIG. 13B is a simulation diagram of a radiation field pattern of a bluetooth earphone 100 corresponding to a head mode in free space when the circuit board 40 shown in FIG. 4 is switched to a second ground structure. FIG. 13C is a simulation diagram of a radiation field pattern of a bluetooth earphone 100 corresponding to a head mode in free space when the circuit board 40 shown in FIG. 4 is switched to a third ground structure. FIG. 14A is a simulation diagram of a radiation field pattern of a bluetooth earphone 100 corresponding to a head mode when the circuit board 40 shown in FIG. 4 is switched to a first ground structure. FIG. 14B is a simulation diagram of a radiation field pattern of a bluetooth earphone 100 corresponding to a head mode when the circuit board 40 shown in FIG. 4 is switched to a second ground structure. FIG. 14C is a simulation diagram of a radiation field pattern of a bluetooth earphone 100 corresponding to a head mode when the circuit board 40 shown in FIG. 4 is switched to a third ground structure.

It can be learned from the simulation diagrams of FIG. 13A to FIG. 14C that, when a user wears the bluetooth earphone 100, an antenna 20 of the bluetooth earphone 100 has different and complementary locations for radiation nulls and radiation intensity points in different ground structures. In addition, the different ground structures of the bluetooth earphone 100 may be switched to each other, so that the antenna 20 of the bluetooth earphone 100 has no obvious radiation null in a radiation direction, thereby ensuring communication quality.

Figure 15A:
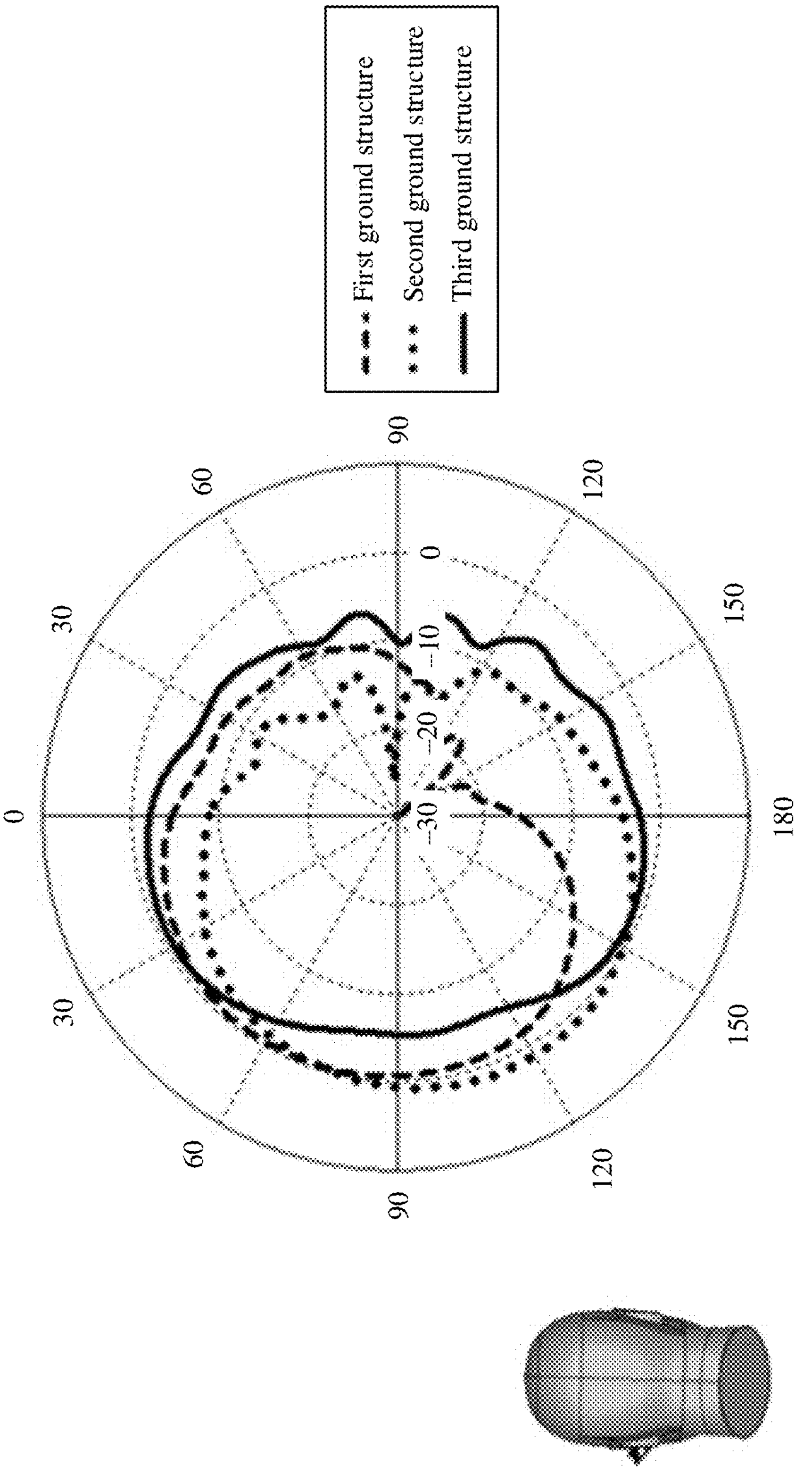
FIG. 15A is a comparison radiation pattern of the bluetooth earphone shown in FIG. 1 corresponding to a vertical section of a head mode in a plurality of ground structures of the circuit board shown in FIG. 4.
Figure 15B:
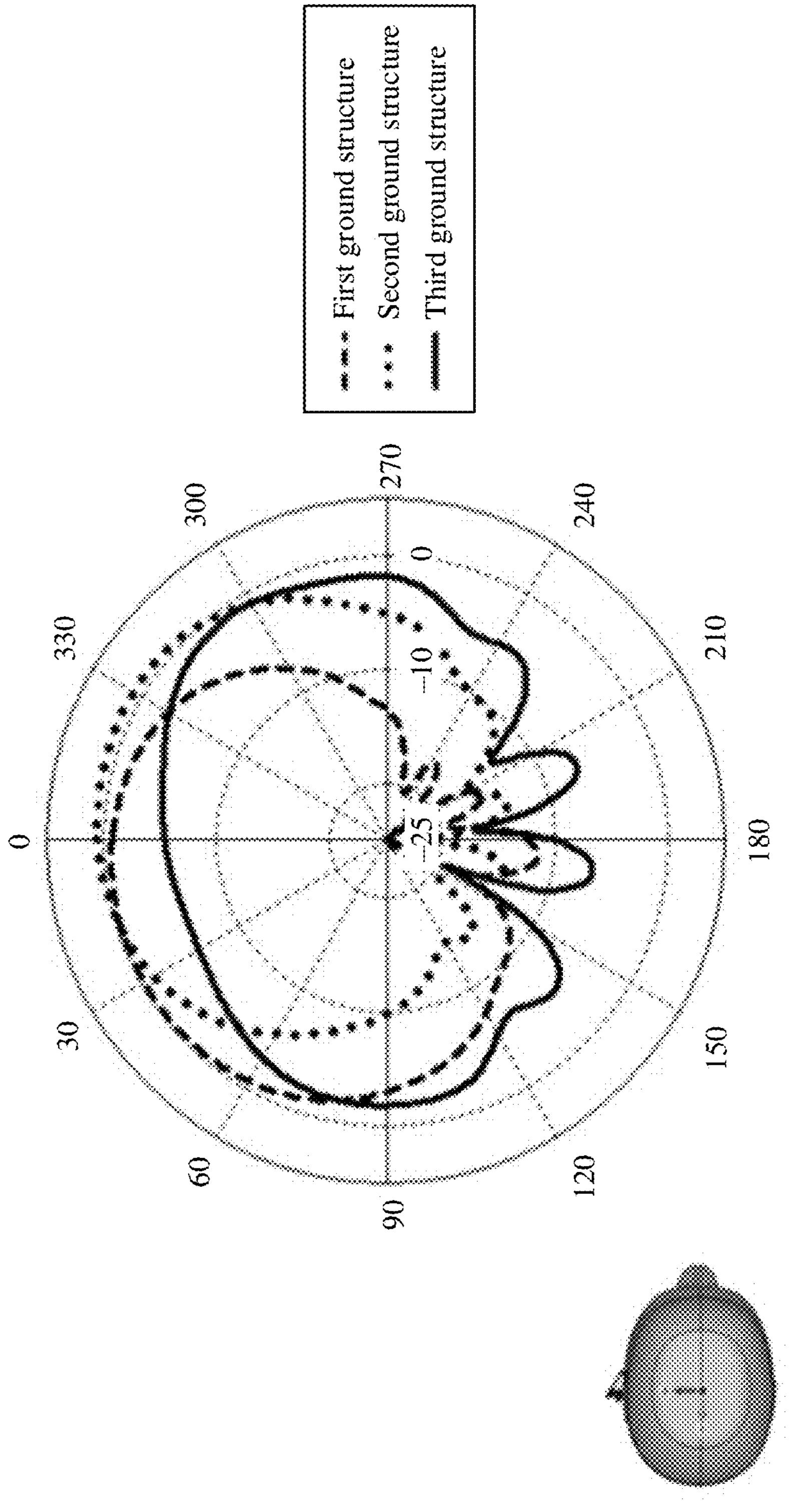
FIG. 15B is a comparison radiation pattern of the bluetooth earphone shown in FIG. 1 corresponding to a horizontal section of a head mode in a plurality of ground structures of the circuit board shown in FIG. 4.

FIG. 15A is a comparison radiation pattern of the bluetooth earphone 100 shown in FIG. 1 corresponding to a vertical section of a head mode in a plurality of ground structures of the circuit board 40 shown in FIG. 4. FIG. 15B is a comparison radiation pattern of the bluetooth earphone 100 shown in FIG. 1 corresponding to a horizontal section of a head mode in a plurality of ground structures of the circuit board 40 shown in FIG. 4. In the radiation patterns of FIG. 15A and FIG. 15B, dashed outlines illustrate the radiation patterns of the bluetooth earphone 100 corresponding to the vertical section and the horizontal section of the head mode in a first ground structure of the circuit board 40 shown in FIG. 4, dot outlines illustrate the radiation patterns of the bluetooth earphone 100 corresponding to the vertical section and the horizontal section of the head mode in a second ground structure of the circuit board 40 shown in FIG. 4, and straight outlines illustrate the radiation patterns of the bluetooth earphone 100 corresponding to the vertical section and the horizontal section of the head mode in a third ground structure of the circuit board 40 shown in FIG. 4.

FIG. 15A and FIG. 15B illustrate that, when the bluetooth earphone 100 is worn on a user head, the antenna 20 that can be switched between the plurality of ground structures has relatively even antenna gains in all directions of the vertical section or the horizontal section, without an obvious null, and communication quality of the antenna 20 is relatively high.

It may be understood that the bluetooth earphone 100 can interact with a bluetooth antenna of an electronic device. The electronic device may be a product such as a mobile phone, a tablet, a computer, or an intelligent wearable device. When the electronic device is placed in different states, the bluetooth antenna of the electronic device has different polarization directions, and the polarization directions of the bluetooth antenna vary with the placement states of the electronic device. In this embodiment, the bluetooth earphone 100 can change the radiation pattern of the antenna 20 of the bluetooth earphone 100 by switching the ground structures. Then a polarization direction of the antenna 20 changes and becomes similar to the polarization direction of the bluetooth antenna of the electronic device, thereby reducing a path loss caused by a polarization difference in a communication process between the bluetooth earphone 100 and the electronic device.

Figure 16:
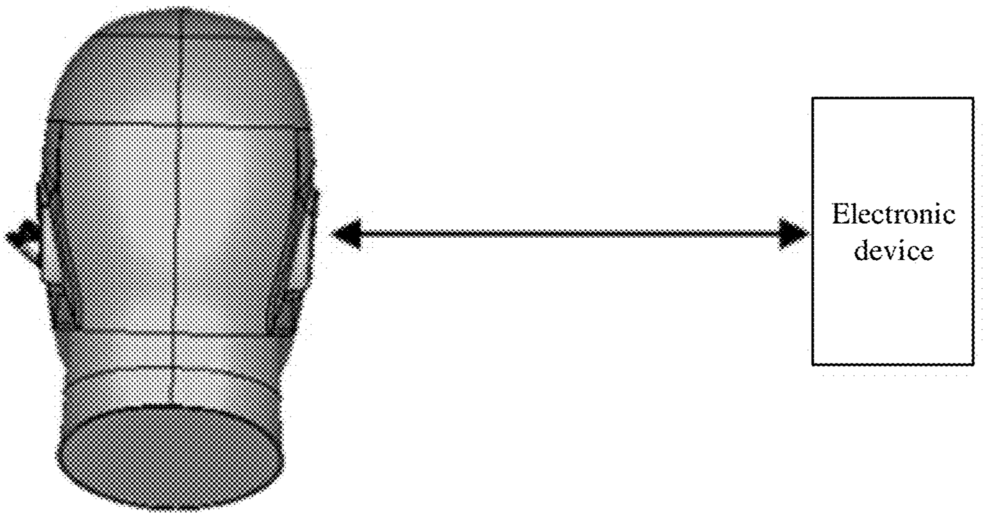
FIG. 16 is a schematic diagram of the bluetooth earphone shown in FIG. 1 in a use state.

FIG. 16 is a schematic diagram of the bluetooth earphone 100 shown in FIG. 1 in a use state. As shown in FIG. 16, when the bluetooth earphone 100 communicates with an electronic device, the electronic device and the bluetooth earphone 100 may be located at a same side or at opposite sides of a head mode. In some embodiments, as shown in FIG. 15A, the antenna 20 of the bluetooth antenna 100 has a higher antenna gain when the bluetooth earphone 100 and the electronic device are located at opposite sides of the head mode in the third ground structure, or when the bluetooth earphone 100 and the electronic device are located at the same side of the head mode in the first ground structure and the second ground structure. Therefore, the bluetooth earphone 100 may switch the radiation patterns by switching the ground structures, to better communicate with the electronic device.

In some embodiments, the first grounding branch 43 is further connected in series to a first choke inductor 432, and the first choke inductor 432 is disposed in parallel with the first switch 431. In this embodiment, the first grounding branch 43 is not only configured to provide a current return path for the antenna 20, but also configured to provide a reference ground for another functional module of the bluetooth earphone 100. Because the first choke inductor 432 is disposed in parallel with the first switch 431, and the first choke inductor 432 is connected in series to the first grounding branch 43, the first grounding branch 43 as a reference ground for a low frequency signal is continuous and complete. For example, the earpiece module 60 is connected to the first grounding branch 43, and the first grounding branch 43 is further configured to provide a reference ground for the earpiece module 60. For example, an inductance value of the first choke inductor 432 may be greater than or equal to 22 nanohenries (nH) to block a signal in the bluetooth frequency band (2.4 GHz) and allow passage of a low frequency signal that is below the bluetooth frequency band. For example, the inductance value of the first choke inductor 432 may be 82 nanohenries (nH).

In some embodiments, the second grounding branch 44 is further connected in series to a second choke inductor 442, and the second choke inductor 442 is disposed in parallel with the second switch 441. In this embodiment, the second grounding branch 44 is not only configured to provide a current return path for the antenna 20, but also configured to provide a reference ground for another functional module of the bluetooth earphone 100. Because the second choke inductor 442 is disposed in parallel with the second switch 441, and the second choke inductor 442 is connected in series to the second grounding branch 44, the second grounding branch 44 as a reference ground for a low frequency signal is continuous and complete. For example, the first microphone module 90 is connected to the second grounding branch 44, and the second grounding branch 44 is further configured to provide a reference ground for the first microphone module 90. For example, an inductance value of the second choke inductor 442 may be greater than or equal to 22 nanohenries (nH) to block a signal in the bluetooth frequency band (2.4 GHz) and allow passage of a low frequency signal that is below the bluetooth frequency band. For example, the inductance value of the second choke inductor 442 may be 82 nanohenries (nH).

In some embodiments, the circuit board 40 further includes a first low-frequency signal line 45, a second low-frequency signal line 46, and a chip pad 47. The chip pad 47 is located at the first connection part 402 of the circuit board 40 and configured to fasten the chip 50. One end of the first low-frequency signal line 45 is connected to the chip pad 47 to connect to the chip 50, and the other end of the first low-frequency signal line 45 extends to the first end part 404. The first low-frequency signal line 45 may be connected to another functional module of the bluetooth earphone 100 and is configured to transmit a low frequency signal between the functional module and the chip 50. For example, the earpiece module 60 is connected to the first low-frequency signal line 45. The first low-frequency signal line 45 transmits a signal between the earpiece module 60 and the chip 50.

The first low-frequency signal line 45 is connected in series to a third choke inductor 451. Because some locations of the first low-frequency signal line 45 may be capacitively coupled to the first grounding branch 43, the first low-frequency signal line 45 is connected in series to the third choke inductor 451, and the first low-frequency signal line 45 is isolated from the ground at a high frequency by using the third choke inductor 451. For example, an inductance value of the third choke inductor 451 may be greater than or equal to 22 nanohenries. For example, the inductance value of the third choke inductor 451 may be 82 nanohenries.

One end of the second low-frequency signal line 46 is connected to the chip pad 47 to connect to the chip 50, and the other end of the second low-frequency signal line 46 extends to the second end part 405. The second low-frequency signal line 46 may be connected to another functional module of the bluetooth earphone 100 and is configured to transmit a low frequency signal between the functional module and the chip 50. For example, the first microphone module 90 is connected to the first low-frequency signal line 45. The first low-frequency signal line 45 transmits a signal between the first microphone module 90 and the chip 50.

The second low-frequency signal line 46 is connected in series to a fourth choke inductor 461. Because some locations of the second low-frequency signal line 46 may be capacitively coupled to the second grounding branch 44, the second low-frequency signal line 46 is connected in series to the fourth choke inductor 461, and the second low-frequency signal line 46 is isolated from the ground at a high frequency by using the fourth choke inductor 461. For example, an inductance value of the fourth choke inductor 461 may be greater than or equal to 22 nanohenries. For example, the inductance value of the fourth choke inductor 461 may be 82 nanohenries.

In some embodiments, the circuit board 40 further includes a first power cable 47 and a second power cable 48. One end of the first power cable 47 is connected to the chip pad 47 to connect to the chip 50, and the other end of the first power cable 47 extends to the first end part 404. One end of the second power cable 48 is connected to the chip pad 47 to connect to the chip 50, and the other end of the second power cable 48 extends to the second end part 405. The first power cable 47 and the second power cable 48 are connected to a power management module of the chip 50. The second power cable 48 is connected to a battery 70, and the power management module is configured to control a charging/discharging process of the battery 70 and a power supply process for another functional module. The first power cable 47 and the second power cable 48 are further configured to connect to another functional module of the bluetooth earphone 100, such as the earpiece module 60 or the first microphone module 90, so that the battery can supply power to the functional module of the bluetooth earphone 100.

A fifth choke inductor 471 may be connected in series to the first power cable 47, and a sixth choke inductor 481 may be connected in series to the second power cable 48. For example, the fifth choke inductor 471 and the sixth choke inductor 481 may be greater than or equal to 22 nanohenries, for example, may be 82 nanohenries.

It may be understood that the second microphone module 110 of the bluetooth earphone 100 may be connected to the second low-frequency signal line 46, the second grounding branch 44, and the second power cable 48. Other modules of the bluetooth earphone 100 may further include a sensor module, and the sensor module may be connected to the first low-frequency signal line 45, the first grounding branch 43, and the first power cable 47.

In some embodiments, the circuit board 40 further includes a matching circuit 49 and a radio frequency circuit 410. For example, the radio frequency circuit 410 is located at a radiation part 401, and the matching circuit 49 is connected between the radio frequency circuit 410 and the feeding pad 41.

The matching circuit 49 may include one or more of a capacitor, an inductor, or a resistor. For example, the matching circuit may include a 1.3-picofarad (pF) capacitor and a 10-nanohenry inductor. In this embodiment, because effective electrical lengths of the first grounding branch 43 and the second grounding branch 44 are similar or the same, the circuit board 40 does not need to provide two matching circuits or an antenna switch for switching the two matching circuits. The circuit board 40 may use one matching circuit 49, thereby simplifying a circuit structure of the circuit board 40 and reducing costs of the circuit board 40.

The radio frequency circuit 410 is configured to process a radio frequency signal. The radio frequency circuit 410 is configured to modulate or demodulate a radio frequency signal. The radio frequency circuit 410 is connected to the chip pad 47 to connect to the chip 50.

Figure 17:
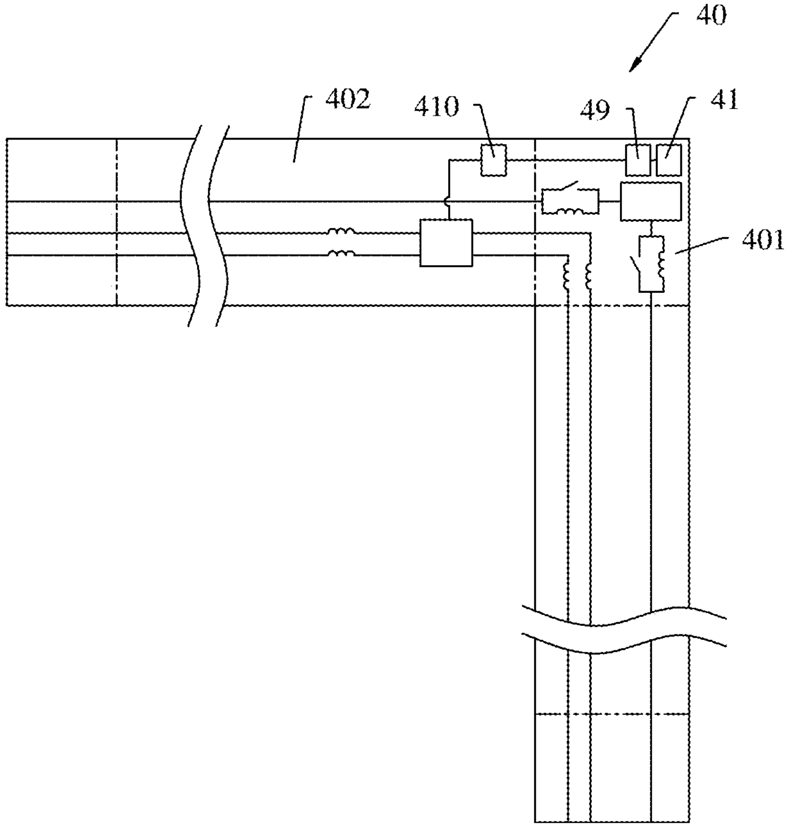
FIG. 17 is a schematic diagram of a structure of the circuit board shown in FIG. 2 in another embodiment.

FIG. 17 is a schematic diagram of a structure of the circuit board 40 shown in FIG. 2 in another embodiment. The following describes a difference between the circuit board 40 in this embodiment and the circuit board 40 in the foregoing embodiments, and most content that is the same as that of the circuit board 40 in the foregoing embodiments is not described again. In this embodiment, the radio frequency circuit 410 of the circuit board 40 may be located at the first connection part 402. The matching circuit 49 is still located at the feeding part 401, to keep a relatively small distance from the feeding pad 41, so that a radio frequency signal transmitted and received by the feeding pad 41 has higher quality.

In another embodiment, a radio frequency processing module may be disposed on the chip 50 of the bluetooth earphone 100, to process a radio frequency signal. In this case, the radio frequency circuit 410 is no longer disposed on the circuit board 40, and the radio frequency processing module of the chip 50 is connected to the matching circuit 49.

In the foregoing embodiments, the electrical length of the first grounding branch 43 and the electrical length of the second grounding branch 44 may be adjusted in a plurality of manners. Examples are illustrated as follows:

In a first implementation, the first grounding branch 43 extends from the feeding part 401 to the first end part 404. Therefore, the electrical length of the first grounding branch 43 may be implemented by adjusting the length of the first connection part 402. The second grounding branch 44 extends from the feeding part 401 to the second end part 405. Therefore, the electrical length of the second grounding branch 44 may be implemented by adjusting the length of the second connection part 403.

Figure 18:
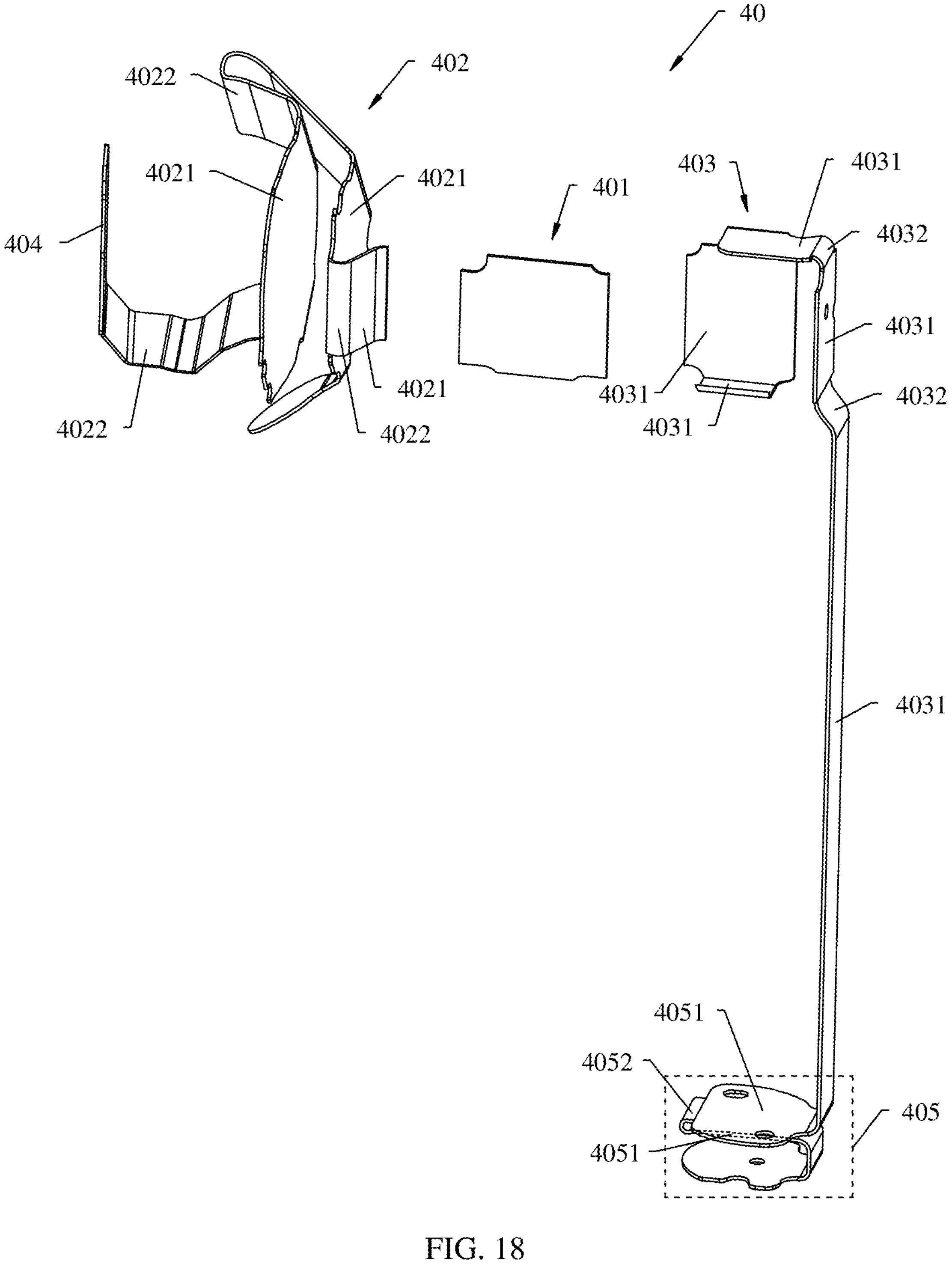
FIG. 18 is a schematic diagram of a structure of the circuit board shown in FIG. 4 in a first implementation.

FIG. 18 is a schematic diagram of a structure of the circuit board 40 shown in FIG. 4 in the first implementation. The first connection part 402 includes a plurality of sequentially connected regions, and the plurality of regions include one or more flat regions 4021 and one or more bent regions 4022. The length of the first connection part 402 may be effectively adjusted in a manner of bending or stretching by increasing or decreasing a quantity or area of the flat regions 4021 and the bent regions 4022, to adjust the length of the first grounding branch 43, so that the electrical length of the first grounding branch 43 meets a requirement.

The second connection part 403 includes a plurality of sequentially connected regions, and the plurality of regions include one or more flat regions 4031 and one or more bent regions 4032. The length of the second connection part 403 may be effectively adjusted in a manner of bending or stretching by increasing or decreasing a quantity or area of the flat regions 4031 and the bent regions 4032, to adjust the length of the second grounding branch 44, so that the electrical length of the second grounding branch 44 meets a requirement.

In some embodiments, as shown in FIG. 18, the electrical length of the second grounding branch 44 may be implemented by adjusting a length of the second end part 405. For example, the second end part 405 includes a plurality of sequentially connected regions, and the plurality of regions include one or more flat regions 4051 and one or more bent regions 4052. The length of the second end part 405 may be effectively adjusted in a manner of bending or stretching by increasing or decreasing a quantity or area of the flat regions 4051 and the bent regions 4052, to adjust the length of the second grounding branch 44, so that the electrical length of the second grounding branch 44 meets a requirement.

In a second implementation, as current return paths of the antenna 20, the first grounding branch 43 and the second grounding branch 44 work in a bluetooth frequency band. In the embodiments, a low-pass high-resistance element may be connected in series to the first grounding branch 43 and the second grounding branch 44, to adjust electrical lengths of the first grounding branch 43 and the second grounding branch 44.

Figure 19:
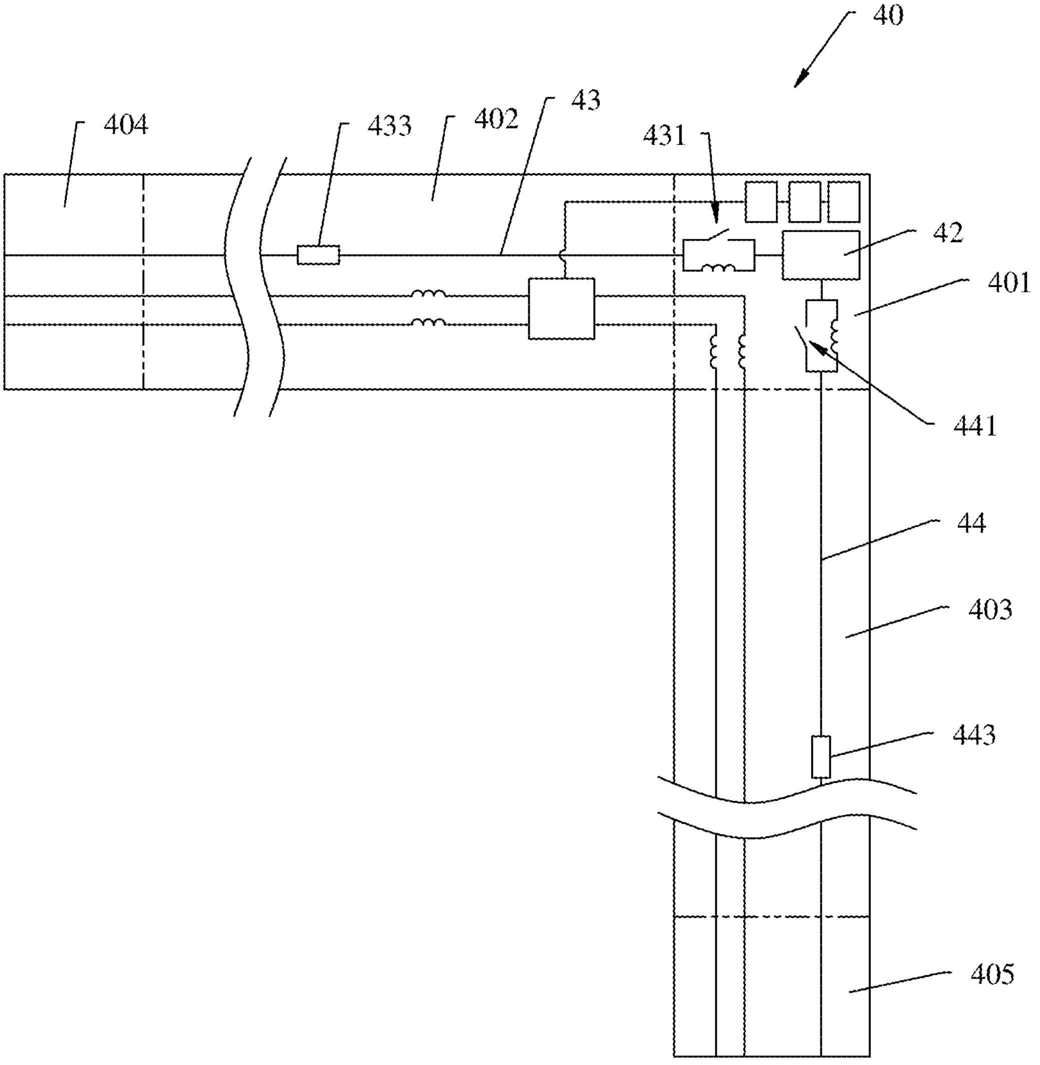
FIG. 19 is a schematic diagram of a structure of the circuit board shown in FIG. 4 in a second implementation.

FIG. 19 is a schematic diagram of a structure of the circuit board 40 shown in FIG. 4 in the second implementation. The first grounding branch 43 is further connected in series to a first low-pass high-resistance element 433, and the first low-pass high-resistance element 433 is disposed in series with the first switch 431 and is located at a side of the first switch 431 that is away from the ground plane 42. The first low-pass high-resistance element 433 is configured to allow passage of a current whose frequency band is lower than the bluetooth signal frequency band and prevent passage of a current whose frequency band is close to the bluetooth signal frequency band. In this case, the first low-pass high-resistance element 433 changes the electrical length of the first grounding branch 43 as the current return path of the antenna 20, so that the first grounding branch 43 meets the electrical length requirement, without affecting a function of the first grounding branch 43 as a reference ground for a low frequency signal. For example, the first low-pass high-resistance element 433 may be located at the first connection part 402 or the first end part 404.

The second grounding branch 44 is further connected in series to a second low-pass high-resistance element 443, and the second low-pass high-resistance element 443 is disposed in series with the second switch 441 and is located at a side of the second switch 441 that is away from the ground plane 42. The second low-pass high-resistance element 443 is configured to allow passage of a current whose frequency band is lower than the bluetooth signal frequency band and prevent passage of a current whose frequency band is close to the bluetooth signal frequency band. In this case, the second low-pass high-resistance element 443 changes the electrical length of the second grounding branch 44 as the current return path of the antenna 20, so that the second grounding branch 44 meets the electrical length requirement, without affecting a function of the second grounding branch 44 as a reference ground for a low frequency signal. For example, the second low-pass high-resistance element 443 may be located at the second connection part 403 or the second end part 405.

The first low-pass high-resistance element 433 and the second low-pass high-resistance element 443 may be inductors or magnetic beads. For example, when the first low-pass high-resistance element 433 and the second low-pass high-resistance element 443 are inductors, an impedance of the inductor may be greater than 1 nanohenry, for example, may be in the range of 20 nanohenries to 70 nanohenries.

In another implementation, the electrical length of the first grounding branch 43 and the electrical length of the second grounding branch 44 may be adjusted by using a combination solution of the foregoing two implementations.

Figure 20:
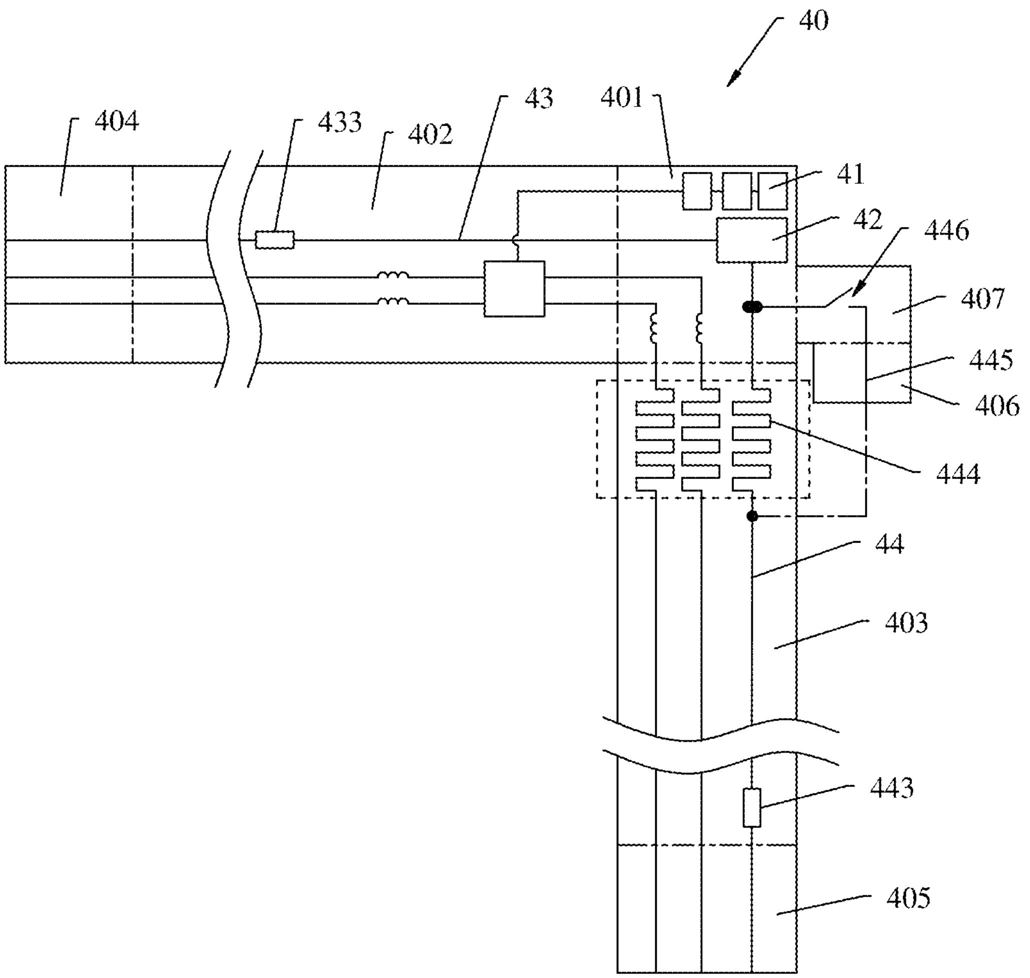
FIG. 20 is a schematic diagram of a structure of the circuit board shown in FIG. 2 in still another embodiment.

FIG. 20 is a schematic diagram of a structure of the circuit board 40 shown in FIG. 2 in still another embodiment. The following describes a difference between the circuit board 40 in this embodiment and the circuit board 40 in the foregoing embodiments, and most content that is the same as that of the circuit board 40 in the foregoing embodiments is not described again. In FIG. 20, a part of the second connection part 403 that is located at the dashed line frame includes a plurality of bent parts. For simplification, FIG. 20 illustrates that a wire passing through the part is bent a plurality of times while the contour of this part is illustrated in a straight line.

The circuit board 40 includes a feeding pad 41, a ground plane 42, a first grounding branch 43, and a second grounding branch 44. The feeding pad 41 is located at a feeding part 401. The feeding pad 41 is configured to be coupled to the antenna 20. The ground plane 42 is located at the feeding part 401 and spaced from the feeding pad 41. One end of the first grounding branch 43 is connected to the ground plane 42 and the other end extends to the first end part 404. One end of the second grounding branch 44 is connected to the ground plane 42 and the other end extends to the second end part 405. The electrical length of the first grounding branch 43 may be a quarter wavelength.

The second grounding branch 44 is connected in series to a first branch 444. The second grounding branch 44 further includes a second branch 445. One end of the second branch 445 is connected to one end of the first branch 444, and the other end of the second branch 445 is connected or coupled to the other end of the first branch 444. The end part of the second branch 445 is connected to the end part of the first branch 444 the end parts of the second branch 445 and the first branch 444 touch each other for direct structural connection and electrical connection. An end part of the second branch 445 is coupled to an end part of the first branch 444 the ends of the second branch 445 and the first branch 444 are close to each other to form a capacitance, thereby implementing electrical coupling. The second branch 445 is connected in series to a switch 446. The second branch 445 is shorter than the first branch 444.

In this embodiment, because a part of the second connection part 403 of the circuit board 40 that is close to the feeding part 401 is located at the connecting section 21 of the earphone handle part 2 of the bluetooth earphone 100, the second connection part 403 needs to be folded inevitably. Therefore, the second connection part 403 is relatively long, and the second grounding branch 44 passing the second connection part 403 and extending to the second end part 405 is also relatively long. Because the second branch 445 is disposed in parallel with the first branch 444, and the second branch 445 is shorter than the first branch 444, when a switch 446 of the second branch 445 is off, a third current on the second grounding branch 44 selects the longer first branch 444 as a path, an electrical length of the second grounding branch 44 is greater than a quarter wavelength, and effective radiation is difficult to form. Therefore, a current return path of the antenna 20 is the first grounding branch 43. When the switch 446 of the second branch 445 is on, the third current on the second grounding branch 44 selects the shorter second branch 445 as a path, an electrical length of the second grounding branch 44 can be shortened to a quarter wavelength to perform effective radiation, and both the second grounding branch 44 and the first grounding branch 43 serve as current return paths of the antenna 20.

Figure 21:
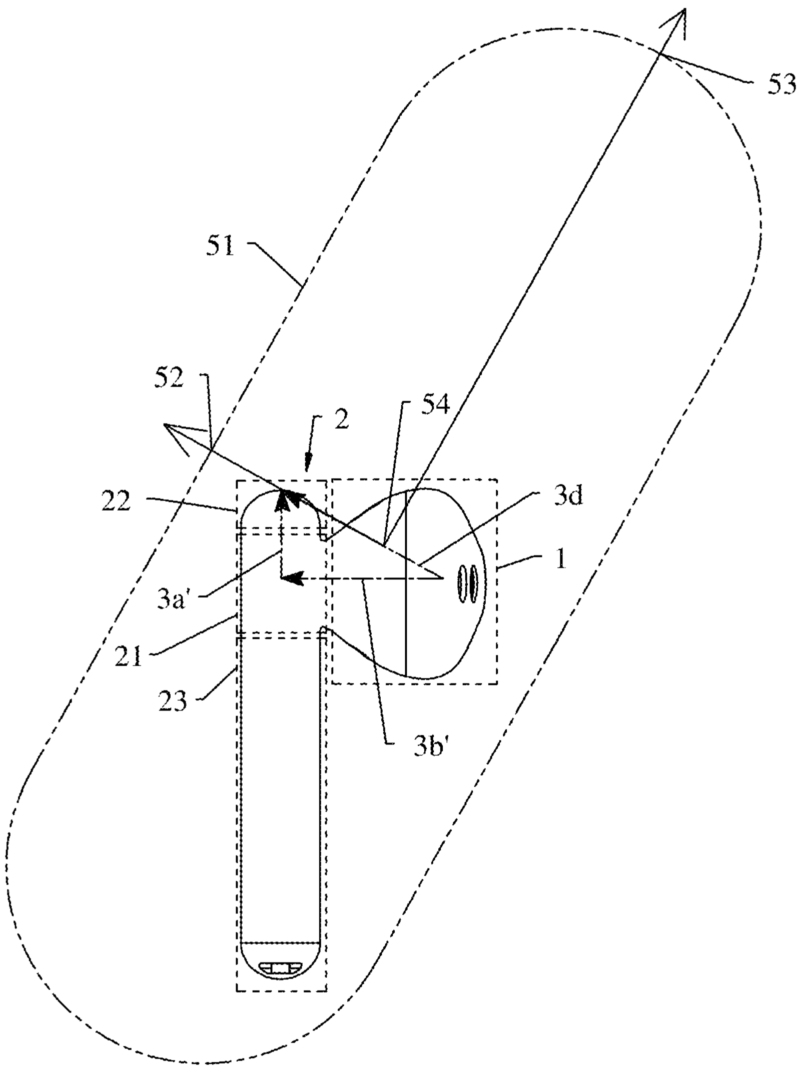
FIG. 21 is a schematic diagram of a radiation field pattern of the bluetooth earphone shown in FIG. 1 in a first ground structure of the circuit board shown in FIG. 20.

FIG. 21 is a schematic diagram of a radiation field pattern 51 of the bluetooth earphone 100 shown in FIG. 1 in a first ground structure of the circuit board 40 shown in FIG. 20. When the switch 446 of the circuit board 40 is off, the first ground structure is formed. The antenna 20 forms a first current, the first current is equivalent to a first equivalent current 3*a*' in FIG. 21, and the first equivalent current 3*a*' extends from the connecting section 21 of the earphone handle part 2 to the top section 22 of the earphone handle part 2. When the switch 446 is off, the first grounding branch 43 serves as a current return path, the first grounding branch 43 forms a second current, the second current is equivalent to a second equivalent current 3*b*' in FIG. 8, and the second equivalent current 3*b*' extends from the earbud part 1 to the connecting section 21 of the earphone handle part 2. The second current and the first current are capable of composing into an equivalent current 3*d* in resonant mode, and the equivalent current 3*d* extends from the earbud part 1 to the top section 22 of the earphone handle part 2.

When an electrical length of the first current is a quarter wavelength and an electrical length of the second current is a quarter wavelength, an electrical length of the equivalent current 3*d* composed by the first current and the second current is a half wavelength, and the equivalent current 3*d* is in resonant mode, so that an antenna signal is effectively radiated. When the circuit board 40 is in the first structure, the radiation field pattern 51 of the bluetooth earphone 100 is shown in FIG. 21. A line connecting a radiation null 52 of the radiation field pattern 51 and a central point 54 is parallel to the equivalent current 3*d*, and a line connecting a radiation intensity point 53 and the central point 54 is perpendicular to the equivalent current 3*d*.

In this embodiment, because the direction of the first current is from the connecting section 21 of the earphone handle part 2 to the top section 22 of the earphone handle part 2, and the direction of the second current is from the earbud part 1 to the connecting section 21 of the earphone handle part 2, the direction of the equivalent current 3*d* composed by the first current and the second current is from the earbud part 1 to the top section 22 of the earphone handle part 2. Therefore, when a user wears the bluetooth earphone 100, the radiation null 52 of the radiation field pattern 51 of the antenna 20 of the bluetooth earphone 100 is toward the user head, thereby greatly reducing an adverse effect of the user head to the antenna 20 and enabling the antenna 20 to have better antenna performance.

Figure 22:
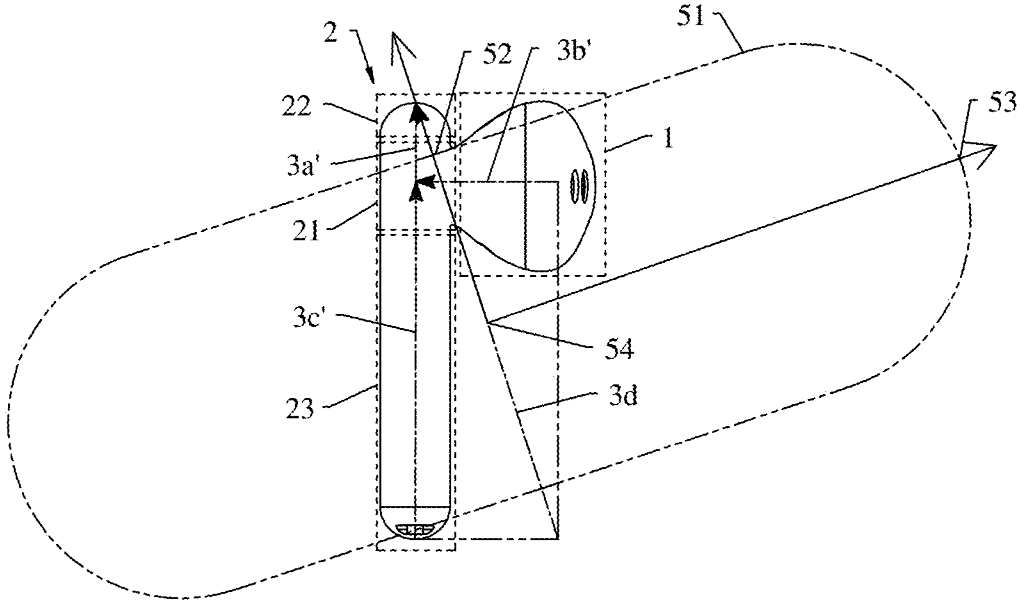
FIG. 22 is a schematic diagram of a radiation field pattern of the bluetooth earphone shown in FIG. 1 in a second ground structure of the circuit board shown in FIG. 20.

FIG. 22 is a schematic diagram of a radiation field pattern 51 of the bluetooth earphone 100 shown in FIG. 1 in a second ground structure of the circuit board 40 shown in FIG. 20. When the switch 446 of the circuit board 40 is on, the second ground structure is formed. The antenna 20 forms a first current, the first current is equivalent to a first equivalent current 3*a*' in FIG. 22, and the first equivalent current 3*a*' extends from the connecting section 21 of the earphone handle part 2 to the top section 22 of the earphone handle part 2. When the switch 446 is on, the first grounding branch 43 and the second grounding branch 44 serve as current return paths. The first grounding branch 43 forms a second current, the second current is equivalent to a second equivalent current 3*b*' in FIG. 22, and the second equivalent current 3*b*' extends from the earbud part 1 to the connecting section 21 of the earphone handle part 2. The second grounding branch 44 forms a third current, the third current is equivalent to a third equivalent current 3*c*' in FIG. 22, and the third equivalent current 3*c*' extends from the bottom section 23 of the earphone handle part 2 to the connecting section 21 of the earphone handle part 2. The first current, the second current, and the third current are capable of composing into an equivalent current 3*d* in resonant mode, and the equivalent current 3*d* extends from the underside of the earbud part 1 (namely, the side near the bottom section 23 of the earphone handle part 2) to the top section 22 of the earphone handle part 2.

When an electrical length of the first current is a quarter wavelength, an electrical length of the second current is a quarter wavelength, and an electrical length of the third current is a quarter wavelength, an electrical length of the equivalent current 3*d* composed by the first current, the second current, and the third current is a three-quarter wavelength, and the equivalent current 3*d* is in resonant mode, so that an antenna signal is effectively radiated. When the circuit board 40 is in the second structure, the radiation field pattern 51 of the bluetooth earphone 100 is shown in FIG. 22. A line connecting a radiation null 52 of the radiation field pattern 51 and a central point 54 is parallel to the equivalent current 3*d*, and a line connecting a radiation intensity point 53 and the central point 54 is perpendicular to the equivalent current 3*d*.

With reference to FIG. 21 and FIG. 22, in different ground structures, the antenna 20 of the bluetooth earphone 100 forms equivalent currents 3*d* in different directions, and the radiation field patterns 51 formed by the antenna 20 are complementary. The bluetooth earphone 100 may switch the ground structures of the circuit board 40 to change locations of the radiation null 52 and the radiation intensity point 53 of the radiation field pattern 51 of the antenna 20. Therefore, the antenna 20 has no obvious radiation null 52 in a radiation direction, and antenna gains of the antenna 20 in all directions are relatively even, thereby improving communication quality.

Figure 23A:
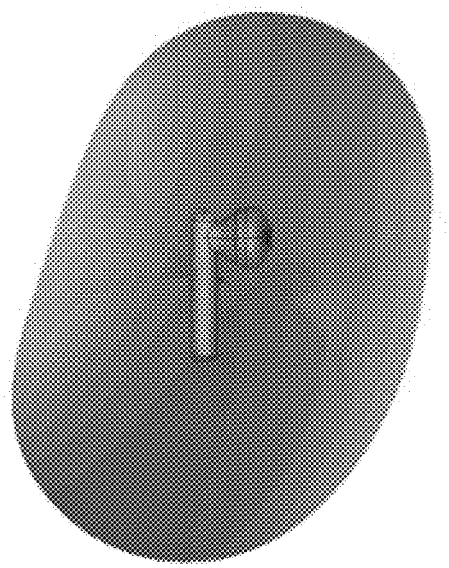
FIG. 23A is a simulation diagram of a radiation field pattern of a bluetooth earphone when the circuit board shown in FIG. 20 is switched to a first ground structure.
Figure 23B:
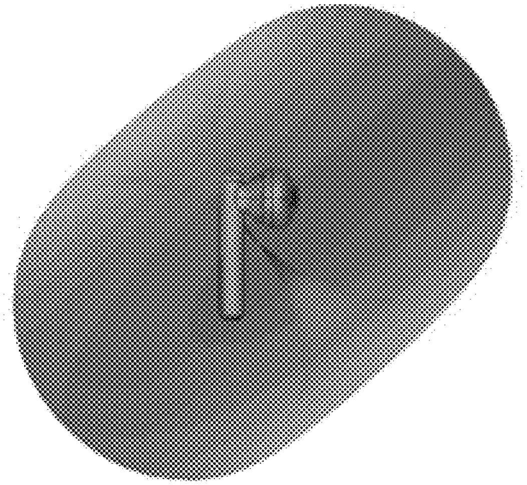
FIG. 23B is a simulation diagram of a radiation field pattern of a bluetooth earphone when the circuit board shown in FIG. 20 is switched to a second ground structure.

FIG. 23A is a simulation diagram of a radiation field pattern of the bluetooth earphone 100 when the circuit board 40 shown in FIG. 20 is switched to a first ground structure. FIG. 23B is a simulation diagram of a radiation field pattern of the bluetooth earphone 100 when the circuit board 40 shown in FIG. 20 is switched to a second ground structure. FIG. 23A and FIG. 23B illustrate again, by using simulation diagrams, the radiation field patterns of the antenna 20 of the bluetooth earphone 100 corresponding to the first ground structure and the second ground structure, and the radiation field patterns of the antenna 20 corresponding to different ground structures are complementary.

As shown in FIG. 23A, when the circuit board 40 switches to the first ground structure, the switch 446 is off, a small part of the second grounding branch 44 may participate in radiation, and a proportion of radiation participation is obviously smaller than that of other currents in a resonance state (namely, the first current and the second current). Therefore, a direction of an effective radiation current (a composed current of all the radiation participation currents) of the antenna 20 rotates a little counterclockwise relative to the equivalent current 3*d* in FIG. 21. Adaptively, the direction of the radiation field pattern of the antenna 20 rotates counterclockwise relative to the radiation field pattern in FIG. 21.

Figure 24:
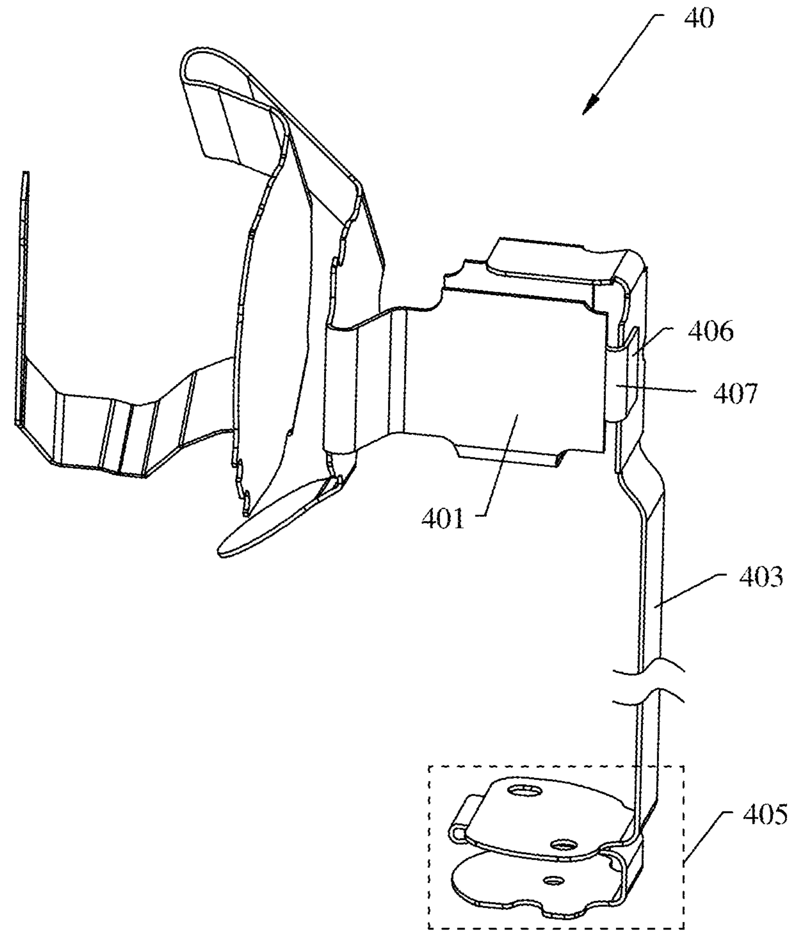
FIG. 24 is a schematic diagram of a structure of the circuit board shown in FIG. 20 in some embodiments.

FIG. 24 is a schematic diagram of a structure of the circuit board 40 shown in FIG. 20 in some embodiments.

The circuit board 40 further includes a third end part 406 and a third connection part 407. The third end part 406 is located at the connecting section 21 of the earphone handle part 2, or at an end of the bottom section 22 of the earphone handle part 2 that is close to the connecting section 21 of the earphone handle part 2, and the third end part 406 is connected to or close to the second connection part 403. When the third end part 406 is connected (for example, welded or connected by conductive adhesive) to the second connection part 403, an electrical connection is formed therebetween. That the third end part 406 is disposed close to the second connection part 403 means that the third end part 406 touches the second connection part 403, or that the third end part 406 does not touch the second connection part 403 but a small gap exists therebetween, and electrical coupling is formed between the third end part 406 and the second connection part 403. One end of the third connection part 407 is connected to the third end part 406, and the other end of the third connection part 407 is connected to the feeding part 401. An end of the second branch 445 that is away from the ground plane 42 extends to the third end part 406 through the third connection part 407. In this case, as shown by a dot-dashed line in FIG. 20, an end of the second branch 445 that is away from the ground plane 42 is connected or coupled to an end of the first branch 444 that is away from the ground plane 42.

In some other embodiments, a carrier medium of the second branch 445 may be different from that of the third end part 406 and the third connection part 407. In this case, a structure of the circuit board 40 may be adjusted accordingly. Implementation of the carrier medium of the second branch 445 is not strictly limited.

In some embodiments, for a method for adjusting the electrical lengths of the first grounding branch 43 and the second grounding branch 44 by the circuit board 40, refer to the foregoing embodiments. For example, as shown in FIG. 20, the electrical lengths of the first grounding branch 43 and the second grounding branch 44 are adjusted by connecting a low-pass high-resistance element in series. The first grounding branch 43 is connected in series to a first low-pass high-resistance element 433. The second grounding branch 44 is connected in series to a second low-pass high-resistance element 443, and the second low-pass high-resistance element 443 is disposed in series with the first branch 444 and is located at a side of the first branch 444 that is away from the ground plane 42. The first low-pass high-resistance element 433 and the second low-pass high-resistance element 443 are configured to allow passage of a current whose frequency band is lower than the bluetooth signal frequency band and prevent passage of a current whose frequency band is close to the bluetooth signal frequency band. In some other embodiments, the electrical length of the first grounding branch 43 may be adjusted by bending or stretching a wiring arrangement part (for example, the first connection part 402) of the circuit board 40. The electrical length of the second grounding branch 44 may be adjusted by bending or stretching a wiring arrangement part (for example, the second connection part 403 and the second end part 405) of the circuit board 40.

In some embodiments, the earpiece module 60 is connected to the first grounding branch 43. The first grounding branch 43 may serve as a current return path of the antenna 20 and may also serve as a reference ground for a low frequency signal of the earpiece module 60. A first microphone module 90 is connected to the second grounding branch 44. The second grounding branch 44 may serve as a current return path of the antenna 20 and may also serve as a reference ground for a low frequency signal of the first microphone module 90.

Figure 25:
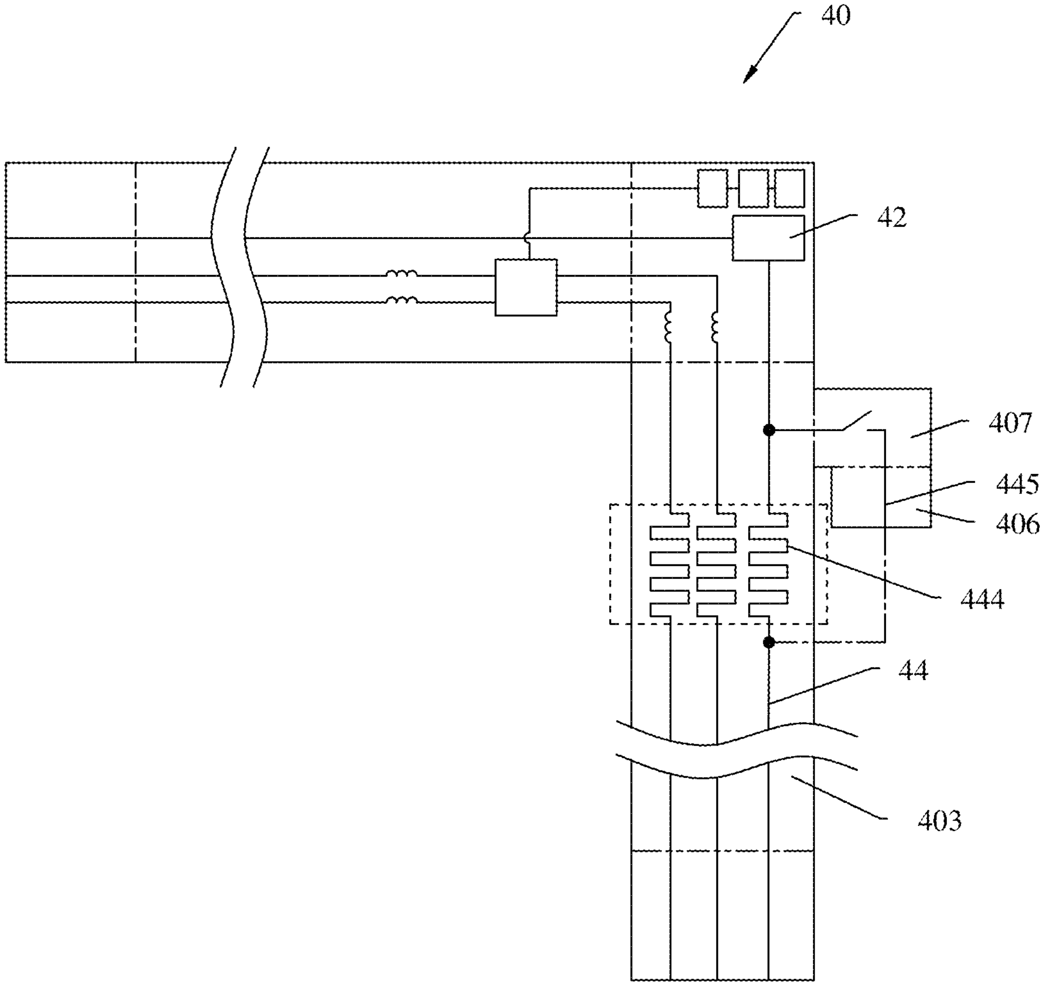
FIG. 25 is a schematic diagram of a structure of the circuit board shown in FIG. 2 in still another embodiment.

FIG. 25 is a schematic diagram of a structure of the circuit board 40 shown in FIG. 2 in still another embodiment. Most content of the circuit board 40 in this embodiment that is the same as that of the circuit board 40 in the foregoing embodiments is not described again. A major difference between this embodiment and the foregoing embodiments lies in that one end of the third connection part 407 is connected to the third end part 406, and the other end of the third connection part 407 is connected to the second connection part 403. In this case, as shown by a dot-dashed line in FIG. 25, an end of the second branch 445 that is away from the ground plane 42 is connected or coupled to an end of the first branch 444 that is away from the ground plane 42.

Figure 26:
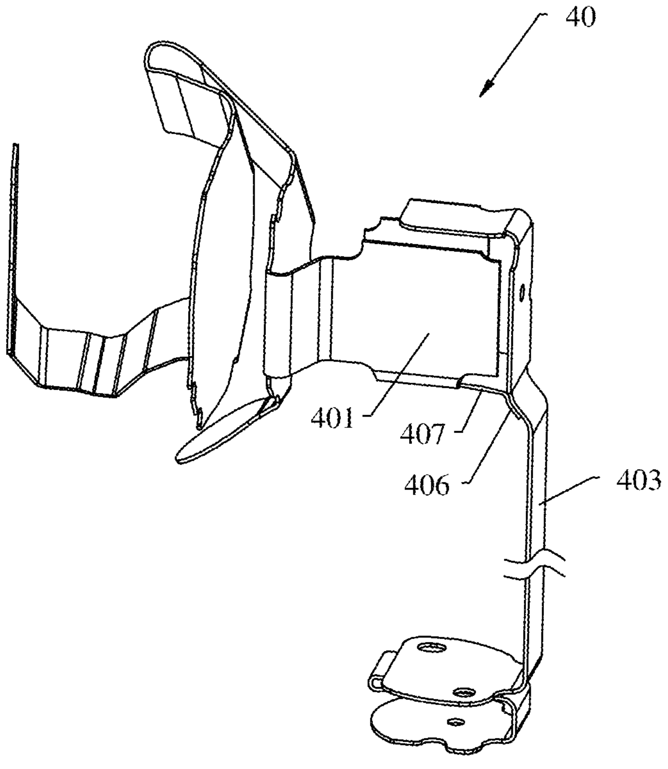
FIG. 26 is a schematic diagram of a structure of the circuit board shown in FIG. 25 in some embodiments.

FIG. 26 is a schematic diagram of a structure of the circuit board 40 shown in FIG. 25 in some embodiments. The third connection part 407 is connected to an end of the second connection part 403 that is close to the feeding part 401. After the circuit board 40 is bent, the third end part 406 is fastened to a side of the second connection part 403 facing the feeding part 401. The second branch 445 located at the third connection part 407 and the third end part 406 can effectively shorten an electrical length of the second grounding branch 44, to meet an electrical length requirement.

Figure 27:
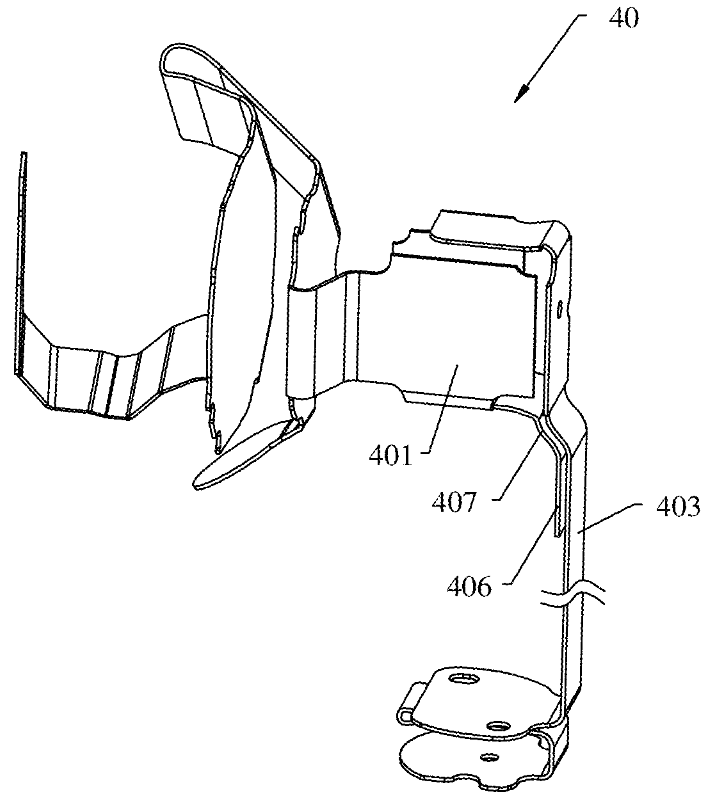
FIG. 27 is a schematic diagram of a structure of the circuit board shown in FIG. 25 in some other embodiments.

FIG. 27 is a schematic diagram of a structure of the circuit board 40 shown in FIG. 25 in some other embodiments. The third connection part 407 is connected to an end of the second connection part 403 that is close to the feeding part 401. After the circuit board 40 is bent, the third end part 406 is close to the second connection part 403 and is located at a side of the second connection part 403 facing the feeding part 401. In the bluetooth earphone 100, the third end part 406 is located between the battery 70 (refer to the location of the battery 70 in FIG. 3) and the second connection part 403. The third end part 406 has a length to form strong coupling with the second connection part 403, so that the second branch 445 located at the third connection part 407 and the third end part 406 can effectively shorten an electrical length of the second grounding branch 44, to meet an electrical length requirement.

The foregoing descriptions are merely implementations, but are not intended to limit the protection scope. Any variation or replacement readily figured out by a person skilled in the art shall fall within the scope of the embodiments. When no conflict occurs, the embodiments and the features in the embodiments may be mutually composed.

What is claimed is:

1. A bluetooth earphone comprising:
- an earbud part, wherein the earbud part is provided with an earpiece module;
- an earphone handle part, further comprising:
  - a connecting section connected to the earbud part,
  - a top section and a bottom section located at both sides of the connecting section, wherein the bottom section of the earphone handle part is provided with a first microphone module;
- an antenna, wherein the antenna extends from the connecting section of the earphone handle part to the top section of the earphone handle part; and
- a circuit board further comprising:
  - a feeding part located at the connecting section of the earphone handle part,
  - a first end part located at the earbud part,
  - a first connection part that connects the feeding part and the first end part,
  - a second end part located at the bottom section of the earphone handle part,
  - a second connection part that connects the feeding part and the second end part,
    - a feeding pad located at the feeding part and coupled to the antenna,
    - a ground plane located at the feeding part and spaced from the feeding pad,
    - a first grounding branch wherein one end of the first grounding branch is connected to the ground plane, the other end of the first grounding branch extends to the first end part, and the first grounding branch is connected in series to a first switch, and
    - a second grounding branch, wherein one end of the second grounding branch is connected to the ground plane, the other end of the second grounding branch extends to the second end part, and the second grounding branch is connected in series to a second switch.

2. The bluetooth earphone according to claim 1, wherein the antenna is configured to form a first current; and
- when the first switch is on and the second switch is off, the first grounding branch is configured to form a second current, wherein the second current and the first current compose an equivalent current in a resonant mode; or
- when the second switch is on and the first switch is off, the second grounding branch is configured to form a third current, wherein the third current and the first current compose the equivalent current in the resonant mode.

3. The bluetooth earphone according to claim 2, wherein when the first switch is on and the second switch is on, the first grounding branch is configured to form a second current, and the second grounding branch is configured to form a third current, wherein the first current, the second current, and the third current compose the equivalent current in the resonant mode.

4. The bluetooth earphone according to claim 1, wherein the first switch is located at the feeding part or at an end of the first connection part that is close to the feeding part, and the second switch is located at the feeding part or at an end of the second connection part that is close to the feeding part.

5. The bluetooth earphone according to claim 1, wherein the first grounding branch is further connected in series to a first choke inductor, the first choke inductor is disposed in parallel with the first switch, and the earpiece module is connected to the first grounding branch.

6. The bluetooth earphone according to claim 1, wherein the second grounding branch is further connected in series to a second choke inductor, the second choke inductor is disposed in parallel with the second switch, and the first microphone module is connected to the second grounding branch.

7. The bluetooth earphone according to claim 6, wherein the bluetooth earphone further comprises:

a chip located at the earbud part and connected to the circuit board, and the circuit board further comprises:

a first low-frequency signal line, and a second low-frequency signal line, wherein one end of the first low-frequency signal line is connected to the chip, the other end of the first low-frequency signal line extends to the first end part, the first low-frequency signal line is connected in series to a third choke inductor, and the earpiece module is connected to the first low-frequency signal line; and one end of the second low-frequency signal line is connected to the chip, the other end of the second low-frequency signal line extends to the second end part, the second low-frequency signal line is connected in series to a fourth choke inductor, and the first microphone module is connected to the second low-frequency signal line.

8. The bluetooth earphone according to claim 1, wherein the second grounding branch is further connected in series to a second low-pass high-resistance element, and the second low-pass high-resistance element is disposed in series with the second switch and located at a side of the second switch that is away from the ground plane.

9. The bluetooth earphone according to claim 1, wherein the second connection part comprises a plurality of sequentially connected regions that comprise one or more flat regions and one or more bent regions.

10. A bluetooth earphone comprising:

an earbud part, wherein the earbud part is provided with an earpiece module;

an earphone handle part, further comprising:

a connecting section connected to the earbud part, a top section and a bottom section located at both sides of the connecting section, wherein the bottom section of the earphone handle part is provided with a first microphone module, an antenna, wherein the antenna extends from the connecting section of the earphone handle part to the top section of the earphone handle part, and a circuit board, further comprising:

a feeding part located at the connecting section of the earphone handle part, a first end part located at the earbud part, a first connection part that connects the feeding part and the first end part, a second end part located at the bottom section of the earphone handle part, and a second connection part that connects the feeding part and the second end part, a feeding pad located at the feeding part and coupled to the antenna, a ground plane located at the feeding part and spaced from the feeding pad, a first grounding branch, wherein one end of the first grounding branch is connected to the ground plane and the other end of the first grounding branch extends to the first end part, and a second grounding branch, wherein one end of the second grounding branch is connected to the ground plane, the other end of the second grounding branch extends to the second end part, the second grounding branch is connected in series to a first branch and further comprises a second branch, one end of the second branch is connected to one end of the first branch and the other end of the second branch is connected or coupled to the other end of the first branch, the second branch is connected in series to a switch, and the second branch is shorter than the first branch.

11. The bluetooth earphone according to claim 10, wherein the antenna is configured to form a first current; and when the switch is off, the first grounding branch is configured to form a second current, wherein the second current and the first current compose an equivalent current in a resonant mode; or when the switch is on, the first grounding branch is configured to form a second current, and the second grounding branch is configured to form a third current, wherein the first current, the second current, and the third current compose the equivalent current in the resonant mode.

12. The bluetooth earphone according to claim 10, wherein the circuit board further comprises:

a third end part located at the connecting section of the earphone handle part or at an end of the bottom section of the earphone handle part that is close to the connecting section of the earphone handle part and is connected to the second connection part or is disposed close to the second connection part, and a third connection part, wherein, one end of the third connection part is connected to the third end part and the other end of the third connection part is connected to the feeding part or the first connection part, and one end of the second branch that is away from the ground plane extends to the third end part through the third connection part.

13. The bluetooth earphone according to claim 10, wherein the earpiece module is connected to the first grounding branch, and the first microphone module is connected to the second grounding branch.

14. The bluetooth earphone according to claim 10, wherein the second grounding branch is connected in series to a second low-pass high-resistance element that is disposed in series with the first branch and is located at a side of the first branch that is away from the ground plane.

* * * * *